US008765848B2

(12) United States Patent
Fell et al.

(10) Patent No.: US 8,765,848 B2
(45) Date of Patent: Jul. 1, 2014

(54) MODIFIED WAXES, A PROCESS FOR THEIR PREPARATION, AND THEIR USE

(75) Inventors: Rainer Fell, Gersthofen (DE); Sebastian Hörold, Diedorf (DE); Matthias Zäh, Gersthofen (DE)

(73) Assignee: Clariant Finance (BVI) Limited, Tortola (VG)

( * ) Notice: Subject to any disclaimer, the term of this patent is extended or adjusted under 35 U.S.C. 154(b) by 794 days.

(21) Appl. No.: 12/225,290

(22) PCT Filed: Mar. 7, 2007

(86) PCT No.: PCT/EP2007/052149
§ 371 (c)(1),
(2), (4) Date: Sep. 16, 2008

(87) PCT Pub. No.: WO2007/104689
PCT Pub. Date: Sep. 20, 2007

(65) Prior Publication Data
US 2010/0286319 A1 Nov. 11, 2010

(30) Foreign Application Priority Data

Mar. 16, 2006 (DE) .......................... 10 2006 011 989
Mar. 16, 2006 (DE) .......................... 10 2006 011 990
Mar. 16, 2006 (DE) .......................... 10 2006 011 991

(51) Int. Cl.
C08K 5/34 (2006.01)
C08K 5/3435 (2006.01)
C08K 5/05 (2006.01)

(52) U.S. Cl.
USPC .............................. 524/99; 524/102; 524/384

(58) Field of Classification Search
USPC ........................................... 524/99, 102, 384
See application file for complete search history.

(56) References Cited

U.S. PATENT DOCUMENTS

| 4,075,165 A * | 2/1978 | Soma et al. ............... 524/99 |
| 4,223,412 A | 9/1980 | Aoyagi et al. |
| 4,668,753 A * | 5/1987 | Kashiwa et al. ........... 526/348 |
| 4,691,015 A | 9/1987 | Behrens et al. |
| 4,921,962 A | 5/1990 | Galbo et al. |
| 5,096,950 A * | 3/1992 | Galbo et al. ............... 524/99 |
| 6,121,445 A | 9/2000 | Suzuki et al. |
| 6,136,973 A | 10/2000 | Suzuki et al. |
| 6,207,736 B1 | 3/2001 | Nass et al. |
| 6,365,071 B1 | 4/2002 | Jenewein et al. |
| 6,509,401 B1 | 1/2003 | Jenewein et al. |
| 6,555,603 B1 | 4/2003 | Kikkawa et al. |
| 6,599,963 B2 | 7/2003 | Srinivasan et al. |

FOREIGN PATENT DOCUMENTS

| DE | 19614424 | 10/1997 |
| DE | 19734437 | 2/1999 |
| DE | 19737727 | 7/1999 |
| EP | 0309402 | 3/1988 |
| EP | 0584567 | 3/1994 |
| EP | 1038912 | 9/2000 |
| JP | 2000-336118 | 12/2000 |
| JP | 2003-286412 | 10/2003 |
| JP | 2004-137304 | 5/2004 |
| WO | WO 96/16948 | 6/1996 |
| WO | WO 98/08898 | 3/1998 |
| WO | WO 98/39306 | 9/1998 |
| WO | WO 98/45364 | 10/1998 |
| WO | WO 9900450 | 1/1999 |
| WO | WO 01/92228 | 12/2001 |

OTHER PUBLICATIONS

PCT International Preliminary Report on Patentability for PCT/EP 2007/052149, mailed Jun. 27, 2008.
PCT International Search Report for PCT/EP 2007/052149, mailed Jun. 8, 2007.
PCT Written Opinion of the International Searching Authority for PCT/EP 2007/052149, Jun. 8, 2007.
Notice of Opposition Against EP 07712461.9, mailed Feb. 25, 2011.
Derwent English Abstract for JP 2000336118, Dec. 5, 2000.
Chemical Abstracts Plus English Abstract for JP 2000336118, Dec. 5, 2000.
English Machine Translation of JP 20033618, Dec. 5, 2000.
Derwent English Abstract of JP 2003286412, Oct. 10, 2003.
Chemical Abstracts Plus English Abstract JP 2003286412, Oct. 10, 2003.
English Machine Translation of JP 2003286412, Oct. 10, 2003.
Derwent English Abstract of JP 2004137304, May 13, 2004.
Cherftical Abstract plus English Abstract of 2004137304, May 13, 2004.
English Machine Translation of JP 2004137304, May 13, 2004.

* cited by examiner

Primary Examiner — Angela C Scott
(74) Attorney, Agent, or Firm — Anthony A. Biscula

(57) ABSTRACT

The invention relates to waxes modified with sterically hindered amines, to a process for their preparation and to their use for stabilizing organic material.

13 Claims, No Drawings

MODIFIED WAXES, A PROCESS FOR THEIR PREPARATION, AND THEIR USE

The invention relates to waxes modified with sterically hindered amines, to a process for their preparation and to their use for stabilizing organic material.

Sterically hindered amines (hindered amine stabilizers, HAS, or hindered amine light stabilizers, HALS) for stabilizing plastics against the damaging effect of, for example, light, heat, other kinds of radiation such as electron beams, for example, or oxidation are known from Plastics Additives Handbook, 5th Edition, Hanser Verlag Munich, pp. 223-230.

Sterically hindered amines with substituents on piperidine groups are known from U.S. Pat. No. 4,233,412 A. EP 0 309 402 A discloses sterically hindered amines which are substituted by alkoxy groups on the piperidine nitrogen.

Amino ethers of short-chain alkanes, cycloalkanes and alkylated benzene derivatives (such as heptane, nonane, cyclohexane, methylcyclohexane, cyclooctane, cyclo-dodecane, toluene, ethylbenzene, cumene, decalin) with sterically hindered amines have been described in U.S. Pat. No. 4,921,962 A. They can be prepared from the sterically hindered amine or from the corresponding nitroxyl compound and short-chain alkane with tert-butyl peroxide and molybdenum trioxide.

In WO 01/92228 A a process has been described for the synthesis of amino ethers, deriving from short-chain alkanes and sterically hindered amines, with tert-butyl peroxide and copper(II) chloride.

All in all, however, all of the compounds available to date have drawbacks which hinder their further use. For instance, the compounds known to date often have a distinct intrinsic yellow to brown colour, which in the majority of areas of application is unwanted or makes the applications impossible.

Other drawbacks of the existing amino ethers of short-chain alkanes are the relatively high volatility of these low molecular mass amino ethers when incorporated into plastics at elevated temperature, the deficient compatibility of the amino ethers with the plastics, and the bad, foul-smelling odour during and after incorporation into the plastics.

Furthermore, the product known to date often lacks sufficient thermal stability, which then leads likewise to unpleasant odour nuisance in the course of processing, for example.

The sterically hindered amines known to date that are substituted by alkoxy radicals, moreover, are of only limited suitability for stabilizing plastics and paints against the damaging effect caused by light, heat or oxidation, particularly as light stabilizers or flame retardants.

Polyolefins are increasingly used in applications where flame retardancy is required. Flame retardancy is nowadays usually achieved via addition of bromine compounds or of phosphorus compounds. Bromine compounds markedly reduce the lightfastness of the polyolefins and their use in the outdoor sector is therefore subject to very great restriction. The amounts of phosphorus flame-retardants that have to be added are very high and moreover these are often ineffective in thin-walled applications, such as fibres and foils.

U.S. Pat. No. 6,599,963 describes polymeric substrates which comprise, as flame-retardant system, a sterically hindered amine and a brominated flame-retardant. WO 99/00450 describes the use of a sterically hindered amine compound E-N, where E is $C_1$-$C_{18}$-alkoxy, $C_5$-$C_{12}$-cycloalkoxy, $C_7$-$C_{25}$-aralkoxy, or $C_6$-$C_{12}$-aryloxy, as flame-retardant for polymers.

Because flame-retardants have chemical reactivity, which is required for flame-retardant action at high temperatures, they can impair the processing stability of plastics. By way of example, increased polymer degradation, crosslinking reactions, evolution of gases, or discoloration can be caused, these being effects which do not occur, or occur only to a lesser extent, when plastics are processed without flame-retardants.

Incorporation of the sterically hindered amines described in WO 99/00450 into foils or fibres is difficult because problems of odour and/or of discoloration occur when they are incorporated. Compounds with low molecular weight can moreover migrate out of the plastics. It was an object of the present invention to provide novel flame-retardants and multifunctional additives which can readily be incorporated into polymers, which do not migrate, and which act not only as flame-retardant but also as light stabilizer.

It is therefore an object of the present invention, for the aforementioned application, to provide innovative compounds which do not have the existing drawbacks and which are superior to the sterically hindered amines known to date that are substituted by alkoxy radicals.

Surprisingly it has been possible to introduce the functionality of the sterically hindered amines directly onto long-chain alkanes, such as waxes, and to obtain products which are superior to their existing counterparts in terms of volatility at high temperatures, compatibility with plastics, stability when the compounds are melted, and by a neutral odour during and after incorporation into plastics. One of the activities of the compounds of the invention is as release agents, and they therefore constitute innovative multifunctional additives.

Further they act as flame-retardants and light stabilizers, and also simultaneously as lubricants and release agents, in polymers. It is surprising that, despite the relatively low content of amino ether groups of the type R—O—N, where R is wax and N is a sterically hindered amine, the compounds are effective flame-retardants.

The compounds are thermally stable and cause no problems of discoloration or of odour when they are incorporated into polymers. The compounds have high molecular weight and do not therefore have any tendency toward migration out of the plastics.

The invention accordingly provides compounds of the formula (A),

(A)

in which
L1 is alike or different and is a group of the formula (M),

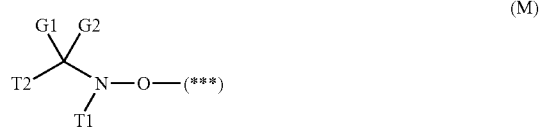

(M)

in which
(***) marks the bond of the group of the formula (M) to the group E in the formula (A);
G1 and G2 can be alike or different and are independently of one another
hydrogen, halogen, $NO_2$, cyano, $CONR_5R_6$, $(R_9)COOR_4$, $C(O)$—$R_7$, $OR_8$, $SR_8$, $NHR_8$, $N(R_{18})_2$, carbamoyl, di($C_1$-$C_{18}$-alkyl)carbamoyl, $C(=NR_5)(NHR_6)$, $C_1$-$C_{18}$-alkyl; $C_3$-$C_{18}$-alkenyl; $C_3$-$C_{18}$-alkynyl, $C_7$-$C_9$-phenylalkyl, $C_3$-$C_{12}$-cycloalkyl or $C_2$-$C_{12}$-heterocycloalkyl;

$C_1$-$C_{18}$-alkyl or $C_3$-$C_{18}$-alkenyl or $C_3$-$C_{18}$-alkynyl or $C_7$-$C_9$-phenylalkyl, $C_3$-$C_{12}$-cycloalkyl or $C_2$-$C_{12}$-heterocycloalkyl, in each case substituted by OH, halogen, $NO_2$, amino, cyano, carboxyl, $COOR_{21}$, $C(O)$—$R_{22}$, $C_1$-$C_4$-alkoxy, $C_1$-$C_4$-alkylthio, $C_1$-$C_4$-alkylamino, di($C_1$-$C_4$-alkyl)amino or O—C(O)—$R_7$;

$C_2$-$C_{18}$-alkyl interrupted by at least one O atom and/or by —$NR_5$—;

$C_6$-$C_{10}$-aryl;

phenyl or naphthyl, in each case substituted by $C_1$-$C_4$-alkyl, $C_1$-$C_4$-alkoxy, $C_1$-$C_4$-alkythio, halogen, cyano, hydroxyl, carboxyl, $COOR_{21}$, $C(O)$—$R_{22}$, $C_1$-$C_4$-alkylamino or di($C_1$-$C_4$-alkyl)amino;

or

G1 and G2, together with C atom to which they are attached, form a $C_3$-$C_{12}$ ring;

T1 is hydrogen, a primary $C_1$-$C_{18}$-alkyl, a secondary $C_3$-$C_{18}$-alkyl, a tertiary $C_4$-$C_{18}$-alkyl or a phenyl group, each of them unsubstituted or substituted by halogen, OH, $COOR_{21}$ or $C(O)$—$R_{22}$; or T1 is $C_5$-$C_{12}$-cycloalkyl, the $C_5$-$C_{12}$-cycloalkyl interrupted by at least one O or —N($R_{18}$)—; or T1 is a polycyclic alkyl radical having 7 to 18 C atoms, or the same radical interrupted by at least one —O— or —N($R_{18}$)—;

T2 is hydrogen, halogen, $NO_2$, cyano or a monovalent organic radical having 1 to 50 C atoms; or T2 and T1 together form a group of the formula (F),

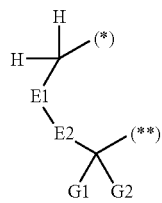

(F)

in which (*) marks the bond to the quaternary C atom, substituted by G1 and G2, in the formula (M), and (**) marks the bond to the nitrogen N in the formula (M), E2 is —CO— or —($CH_2$)$_b$—, b being 0, 1 or 2, preferably 1;

E1 is —CO—, —(C=$NR_{23}$)—, —($NR_{23}$)—, —($CR_{24}R_{25}$)—, or —O—, where $R_{24}$ and $R_{25}$ are alike or different and independently of one another are H, OH, $OR_{26}$ or $NR_{27}R_{28}$;

preferably, $R_{24}$ is H, OH, $OR_{26}$ or $NR_{27}R_{28}$, and $R_{25}$ is, independently of $R_{24}$, OH, $OR_{26}$ or $NR_{27}R_{28}$;

or $R_{24}$ and $R_{25}$ together form a group of the formula (H),

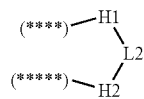

(H)

in which (**) and (***) represent the bond to the quaternary carbon atom of —($CR_{24}R_{25}$)— in E1 from the formula (F), H1 is —$CH_2$—, —CO— or —$NR_{29}$—;

H2 is —O—, —$CH_2$—, —CO— or —$NR_{29}$—;

$R_{23}$, $R_{26}$, $R_{27}$, $R_{28}$ and $R_{29}$ are alike or different and independently of one another are hydrogen or an organic radical having in total 1 to 500 carbon atoms and 0 to 200 heteroatoms, the heteroatoms being oxygen, nitrogen, sulphur, phosphorus, silicon or halogens, L2 is a divalent organic radical having 1 to 500 C atoms and 0 to 200 heteroatoms, the heteroatoms being oxygen, nitrogen, sulphur, phosphorus, silicon or halogens, and which together with H1 and H2 from the formula (H) and with the quaternary carbon atom from —($CR_{24}R_{25}$)— in E1 from the formula (F) forms an optionally substituted 4, 5, 6 or 7 membered ring, preferably a 5 or 6 membered ring;

and $R_4$ is hydrogen, $C_1$-$C_{18}$-alkyl, phenyl, an alkali metal ion or a tetraalkylammonium cation;

$R_5$ and $R_6$ are independently of one another hydrogen, $C_1$-$C_{18}$-alkyl, $C_2$-$C_{18}$-alkyl substituted by hydroxyl or, taken together, form a $C_2$-$C_{12}$-alkylene bridge or a $C_2$-$C_{12}$-alkylene bridge interrupted by —O— or/and —N($R_{18}$)—, preferably $R_5$ and $R_6$ are alike;

$R_7$ is hydrogen, $C_1$-$C_{18}$-alkyl or $C_6$-$C_{10}$-aryl;

$R_8$ is hydrogen, $C_1$-$C_{18}$-alkyl or $C_2$-$C_{18}$-hydroxyalkyl;

$R_9$ is $C_1$-$C_{12}$-alkylene or a bond;

$R_{18}$ is $C_1$-$C_{12}$-alkyl or phenyl, unsubstituted or substituted by halogen, OH, $COOR_{21}$ or $C(O)$—$R_{22}$;

$R_{21}$ is hydrogen, an alkali metal atom or $C_1$-$C_{18}$-alkyl;

$R_{22}$ is $C_1$-$C_{18}$-alkyl;

E is a $C_{60}$-$C_{1\,000\,000}$-alkyl group, it being possible for the alkyl chain of the alkyl group to contain alkyl substituents, aromatic substituents and polar groups as substituents and to be interrupted by alkene units and heteroatoms; and n is an integer from 1 to 1000.

G1 and G2 in the formula (F) have the same meaning as G1 and G2 in the formula (M).

G1 and G2, independently of one another, are preferably hydrogen, $C_1$-$C_{18}$-alkyl, $C_3$-$C_{18}$-alkenyl, $C_3$-$C_{18}$-alkynyl, $C_7$-$C_9$-phenylalkyl, $C_3$-$C_{12}$-cycloalkyl; or G1 and G2, together with the C atom to which they are attached, form a $C_3$-$C_{12}$ ring, preferably a $C_5$-$C_{12}$ ring, in particular cyclopentylene, cyclohexylene or cycloheptylene.

Preferably

G1 and G2 independently of one another are hydrogen or $C_1$-$C_{18}$-alkyl;

T1 is a tertiary $C_4$-$C_{18}$-alkyl group or phenyl group;

T2 is hydrogen or a monovalent organic radical containing 1 to 50 carbon atoms; or T2 and T1 together form a group of the formula (F), b being 0 or 1, preferably 1.

Where T2 and T1 together form a group of the formula (F),

G1 and G2 independently of one another are preferably methyl, ethyl, phenyl or $COOR_4$;

$R_4$ being hydrogen or $C_1$-$C_{18}$-alkyl.

G1 and G2 more preferably are independently of one another $C_1$-$C_4$-alkyl, or G1 and G2 together form pentamethylene;

G1 and G2 in particular are independently of one another methyl, ethyl or propyl, preferably methyl or ethyl.

With especial preference G1 is methyl and G2 is methyl, ethyl or propyl, preferably methyl.

Preferably n is an integer from 1 to 20, more preferably from 1 to 10.

If L1 in the formula (A) is different, in other words if the substituents L1 in the formula (A) are chemically different substituents, the substituents in question are preferably up to 10, more preferably up to 5, in particular 2, chemically different substituents L1.

$R_{24}$ is preferably hydrogen and $R_{25}$ is preferably hydrogen, hydroxyl, —$OR_{26}$ or —$NR_{27}R_{28}$; more preferably $R_{24}$ is hydrogen and $R_{25}$ is hydroxyl, —$OR_{26}$ or —$NR_{27}R_{28}$;

or $R_{24}$ and $R_{25}$ together form a group of the formula (H) in which

H1 is preferably —CO—;

H2 is preferably —O— or —$NR_{29}$—.

Preferably T1 and T2 together with the nitrogen atom N in the formula (M) and with the quaternary C atom, substituted by G1 and G2, in the formula (M) are a tetramethylpiperidyl group.

Preferably the tetramethylpiperidyl group is one of the groups 2,2,6,6-tetramethylpiperidine,
2,2,6,6-tetramethylpiperidin-4-one,
2,2,6,6-tetramethylpiperidin-4-ol,
4-amino-2,2,6,6-tetramethylpiperidine,
2,2,4,4-tetramethyl-7-oxa-3,20-diazadispiro-[5.1.11.2]heneicosan-21-one,
2,2,4,4-tetramethyl-20-lauryloxycarbonylethyl-7-oxa-3,20-diazadispiro[5.1.11.2]-heneicosan-21-one,
2,2,4,4-tetramethyl-20-myristyloxycarbonylethyl-7-oxa-3,20-diazadispiro[5.1.11.2]-heneicosan-21-one,
bis(2,2,6,6-tetramethyl-4-piperidinyl)sebacate,
esters of 2,2,6,6-tetramethyl-4-piperidinol with higher fatty acids, especially stearic or palmitic acid and mixtures thereof,
N,N'-bis-2,2,6,6-tetramethyl-4-piperidinyl-1,3-benzenedicarboxamide,
2,2,4,4-tetramethyl-20-(β-myristyloxycarbonyl)ethyl-7-oxa-3,20-diazadispiro-[5.1.11.2]heneicosan-21-one,
2,2,4,4-tetramethyl-20-(β-lauryloxycarbonyl)ethyl-7-oxa-3,20-diazadispiro-[5.1.11.2]-heneicosan-21-one,
3-dodecyl-1-(2,2,6,6-tetramethyl-4-piperidyl)pyrrolidine-2,5-dione,
2,2,6,6-tetramethyl-4N-(β-lauryloxycarbonyl)ethylaminopiperidine,
2,2,6,6-tetramethyl-4N-(β-myristyloxycarbonyl)ethylaminopiperidine,
N,N'-1,6-hexanediylbis(N-(2,2,6,6-tetramethylpiperidin-4-yl)formamide),
2,6-bis(2,2,6,6-tetramethylpiperidin-4-yl)-1H,4H,5H,8H-2,3a,4a,6,7a,8a-hexaazaper-hydrocyclopentafluorene-4,8-dione or
3-dodecyl-7,7,9,9-tetramethyl-1,3,8-triazaspiro[4.5]decane-2,4-dione.

More preferably, the tetramethylpiperidyl group is one of the groups 2,2,6,6-tetramethylpiperidin-4-one,
2,2,6,6-tetramethylpiperidin-4-ol,
4-amino-2,2,6,6-tetramethylpiperidine,
2,2,4,4-tetramethyl-7-oxa-3,20-diazadispiro-[5.1.11.2]heneicosan-21-one,
2,2,4,4-tetramethyl-20-lauryloxycarbonylethyl-7-oxa-3,20-diazadispiro[5.1.11.2]-heneicosan-21-one,
2,2,4,4-tetramethyl-20-myristyloxycarbonylethyl-7-oxa-3,20-diazadispiro[5.1.11.2]-heneicosan-21-one,
bis(2,2,6,6-tetramethyl-4-piperidinyl)sebacate,
esters of 2,2,6,6-tetramethyl-4-piperidinol with higher fatty acids, especially stearic or palmitic acid and mixtures thereof,
N,N'-bis-2,2,6,6-tetramethyl-4-piperidinyl-1,3-benzenedicarboxamide,
2,2,4,4-tetramethyl-20-(β-myristyloxycarbonyl)ethyl-7-oxa-3,20-diazadispiro-[5.1.11.2]heneicosan-21-one,
2,2,4,4-tetramethyl-20-(β-lauryloxycarbonyl)ethyl-7-oxa-3,20-diazadispiro-[5.1.11.2]-heneicosan-21-one,
3-dodecyl-1-(2,2,6,6-tetramethyl-4-piperidyl)pyrrolidine-2,5-dione,
2,2,6,6-tetramethyl-4N-(β-lauryloxycarbonyl)ethylaminopiperidine,
2,2,6,6-tetramethyl-4N-(β-myristyloxycarbonyl)ethylaminopiperidine,
N,N'-1,6-hexanediylbis(N-(2,2,6,6-tetramethylpiperidin-4-yl)formamide),
2,6-bis(2,2,6,6-tetramethylpiperidin-4-yl)-1H,4H,5H,8H-2,3a,4a,6,7a,8a-hexaazaper-hydrocyclopentafluorene-4,8-dione or
3-dodecyl-7,7,9,9-tetramethyl-1,3,8-triazaspiro[4.5]decane-2,4-dione.

Even more preferably, the tetramethylpiperidyl group is one of the groups 2,2,6,6-tetramethylpiperidin-4-one,
2,2,6,6-tetramethylpiperidin-4-ol,
2,2,4,4-tetramethyl-7-oxa-3,20-diazadispiro-[5.1.11.2]heneicosan-21-one,
bis(2,2,6,6-tetramethyl-4-piperidinyl)sebacate,
esters of 2,2,6,6-tetramethyl-4-piperidinol with higher fatty acids, especially stearic or palmitic acid and mixtures thereof or
3-dodecyl-7,7,9,9-tetramethyl-1,3,8-triazaspiro[4.5]decane-2,4-dione, or the compound of formula (A) carries different groups L1, so that n is greater than 1 in formula (A) and L1 is different and denotes esters of 2,2,6,6-tetramethyl-4-piperidinol with higher fatty acids, especially stearic or palmitic acid and mixtures thereof, or
3-dodecyl-1-(2,2,6,6-tetramethyl-4-piperidyl)pyrrolidine-2,5-dione.

In particular the tetramethylpiperidyl group is one of the groups 2,2,4,4-tetramethyl-7-oxa-3,20-diazadispiro-[5.1.11.2]heneicosan-21-one,
esters of 2,2,6,6-tetramethyl-4-piperidinol with higher fatty acids, especially stearic or palmitic acid and mixtures thereof,
3-dodecyl-1-(2,2,6,6-tetramethyl-4-piperidyl)pyrrolidine-2,5-dione, or
bis(2,2,6,6-tetramethyl-4-piperidinyl)sebacate.

In particular the tetramethylpiperidyl group is the group of esters of 2,2,6,6-tetramethyl-4-piperidinol with higher fatty acids, especially stearic or palmitic acid and mixtures thereof.

Where L1 in the formula (A) is different, in other words when the substituents L1 in the formula (A) are chemically different substituents, the groups in question are preferably the two tetramethylpiperidyl groups of the ester of 2,2,6,6-tetramethyl-4-piperidinol with higher fatty acids, especially stearic or palmitic acid and mixtures thereof, and of 3-dodecyl-1-(2,2,6,6-tetramethyl-4-piperidyl)pyrrolidine-2,5-dione.

Where L1 is not a cyclic group it is preferably an N-oxylamine group of di-tert-butylamine or
diisopropylamine.

Further in particular, especially in the case, that the compounds of formula (A) are used as flame retardants, the compound of formula (A) is represented by the compound of formula (100),

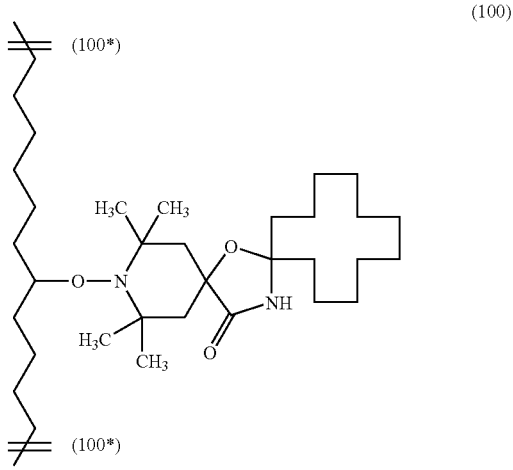 [SMILES: CCCCCCCC(CCCCC)ON1C(C)(C)CC2(CC1(C)C)OC1(CCCCCCCCCCC1)NC2=O]

with the chain between the notations (100*) denoting the backbone of the wax.

The group E in the formula (A), also referred to as alkyl group E below, derives preferably from a wax.

Waxes may be understood here, in accordance with a definition by the Deutsche Gesellschaft für Fettwissenschaft, as a collective designation for a range of natural or artificially (partly or fully synthetically) obtained substances which have the following properties (Fette Seifen Anstrichmittel 1974, 76, 135):
  kneadable at 20° C.,
  solid to brittly hard,
  coarsely to finely crystalline,
  translucent to opaque, but not glassy,
  melting above 40° C. without decomposition,
  of relatively low viscosity even a short way above the melting point,
  strongly temperature-dependent consistency and solubility,
  polishable under slight pressure.

With preference the alkyl group E is a group corresponding to the structure of fully synthetic or partially synthetic or natural waxes.

Examples of suitable natural waxes include plant waxes such as carnauba wax or candelilla wax, or waxes of animal origin such as shellac, for example. Examples of suitable partially synthetic waxes are bleached montan wax derivatives possibly modified chemically, for example, by esterification and/or by partial hydrolysis. Corresponding products are described for example in Ullmann's Encyclopedia of Industrial Chemistry, 5th Ed., Vol. A 28, Weinheim 1996 in sections 2.2, 2.3 and 3.1-3.5 (pages 110-126).

In addition it is possible to use polar or nonpolar fully synthetic waxes, such as polyolefin waxes, for example. Nonpolar polyolefin waxes can be prepared by thermal degradation of branched or unbranched polyolefin polymers or by direct polymerization of olefins. Examples of suitable polymerization processes include free-radical processes, in which the olefins, generally ethylene, are reacted under high pressures and temperatures to form waxes with a greater or lesser degree of branching, and also processes in which ethylene and/or higher 1-olefins are polymerized to branched or unbranched waxes using organometallic catalysts, such as Ziegler-Natta or metallocene catalysts, for example. Corresponding methods of preparing olefin homopolymer and copolymer waxes are described for example in Ullmann's Encyclopedia of Industrial Chemistry, 5th Ed., Vol. A 28, Weinheim 1996 in sections 6.1.1./6.1.2. (High-pressure polymerization), section 6.1.2. (Ziegler-Natta polymerization, polymerization with metallocene catalysts) and section 6.1.4. (Thermal degradation).

Polar polyolefin waxes are formed by corresponding modification of nonpolar waxes, such as by oxidation with air or by graft attachment of polar olefin monomers, examples being α,β-unsaturated carboxylic acids and/or their derivatives, such as acrylic acid or maleic anhydride. A further possibility is to prepare polyolefin waxes by copolymerizing ethylene with polar comonomers, vinyl acetate or acrylic acid for example; or else by oxidative degradation of non-waxlike ethylene homopolymers and copolymers of relatively high molecular mass. Corresponding examples are found for instance in Ullmann's Encyclopedia of Industrial Chemistry, 5th Ed., Vol. A 28, Weinheim 1996, section. 6.1.5.

Suitable polyolefin waxes include degradation waxes, prepared by thermal degradation of ethylene or 1-olefin homopolymers and copolymers, polyethylene or polypropylene for example. A further possibility is to use waxes obtained by polymerization in a free-radical process or using Ziegler-Natta or metallocene catalysts, examples being homopolymers of ethylene or of higher 1-olefins or their copolymers with one another. 1-Olefins used are linear or branched olefins having 3-18 C atoms, preferably 3-6 C atoms, it also being possible for these olefins to contain polar functions such as ester groups or acid groups. Examples thereof are propene, 1-butene, 1-hexene, 1-octene or 1-octadecene, vinyl acetate, acrylic acid, and acrylic esters such as methyl acrylate or ethyl acrylate. Preference is given to homopolymers of ethylene or propene or their copolymers with one another. The copolymers are composed to an extent of 70-99.9%, preferably 80-99%, by weight of one kind of olefin.

Also suitable are polar waxes prepared by modification of aforementioned polyolefin waxes. The modification is accomplished by processes which are known in principle, such as by oxidation with oxygen-containing gases, air for example, and/or by grafting with α,β-unsaturated acids or their derivatives such as acrylic acid or methacrylic acid, acrylic esters such a methyl or ethyl acrylate, maleic anhydride or maleic esters such as dimethyl maleate or diethyl maleate.

The alkyl group E is preferably a group corresponding to the structure of fully synthetic waxes, which may be polar or nonpolar or may have undergone polar modification.

Nonpolar fully synthetic waxes are preferably polyolefin waxes or Fischer-Tropsch paraffins.

The nonpolar fully synthetic waxes are preferably polyolefin waxes which are prepared by thermal degradation of branched or unbranched polyolefin polymers or by direct polymerization of olefins.

The nonpolar fully synthetic waxes are preferably homopolymers and copolymers of ethylene, propylene and/or other olefins.

The nonpolar fully synthetic waxes are preferably homopolymers and copolymers of ethylene or propylene with $C_3$ to $C_{20}$ alpha-olefins.

The nonpolar fully synthetic waxes are preferably homopolymers and copolymers of ethylene or propylene.

The nonpolar fully synthetic waxes are preferably homopolymers and copolymers of ethylene or propylene or copolymers of ethylene and propylene which are prepared by the Ziegler-Natta process or the metallocene process.

Polar fully synthetic waxes are preferably polar polyolefin waxes which have been obtained by oxidation with air, by graft attachment of polar olefin monomers, by copolymerization of olefins, preferably of ethylene, with polar comonomers and/or by oxidative degradation of non-waxlike polymers of relatively high molecular mass, such as preferably polyethylene, polypropylene or copolymers thereof.

The polar fully synthetic waxes are preferably polyethylene, polypropylene and/or polyethylene/polypropylene copolymers which have been converted into the polar fully synthetic waxes by oxidation or by grafting with monomers containing vinyl groups.

The monomers containing vinyl groups are preferably maleic acid derivatives, fumaric acid derivatives, acrylic acid derivatives, methacrylic acid derivatives, styrene and/or silicon-containing olefins.

The polar fully synthetic waxes are preferably oxidized polyethylene waxes and/or polypropylene waxes.

The natural or partially synthetic waxes are preferably fossil waxes, plant waxes, animal waxes and derivatives thereof.

The natural or partially synthetic waxes are preferably montan waxes, paraffins and/or carnauba waxes which may have been oxidized, hydrolysed, esterified or amidated.

The chain length of the alkyl groups E is preferably of from 60 to 10 000 C atoms.

The chain length of the alkyl groups E is more preferably of from 60 to 1000 C atoms.

The chain length of the alkyl groups E is particularly of from 80 to 10 000 C atoms.

The chain length of the alkyl groups E is more particularly of from 80 to 1000 C atoms.

The chain length of the alkyl groups E is even more particularly of from 80 to 800 C atoms, preferably 100 to 800.

The chain length of the alkyl groups E is especially preferably of from 120 to 10 000 C atoms.

The chain length of the alkyl groups E is more especially preferably of from 120 to 1000 C atoms.

The chain length of the alkyl groups E is even more especially preferably of from 120 to 800 C atoms.

The chain length of the alkyl groups E is particularly especially of from 120 to 700 C atoms.

The chain length of the alkyl groups E is more particularly especially of from 150 to 700 C atoms.

Since a wax usually does not consist of only one single species of molecule, i.e. each molecule having exactly the same chain length, but is rather characterized by a specific distribution of the chain lengths of the molecules, a wax, from which E derives in the case of E being for example of from 80 to 1000 C atoms means, that also a part of the molecules of the wax may have chain lengths of more than 1000 C atoms or of less than 80 C atoms. Preferably, the maximum of the chain length distribution of the wax is within the defined ranges of the numbers of the C atoms of E; or preferably more than 30% by weight of the wax, based on the total weight of the wax, shows chain lengths within the defined ranges of the numbers of the C atoms of E.

The invention also provides a process for preparing compounds of the formula (A), characterized in that at least one compound of the formula (B), also referred to below as amine, and/or at least one compound of the formula (C), also referred to below as N-oxylamine or nitroxyl compound,

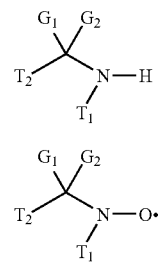

in which G1, G2, T1 and T2 have the same meaning as in formula (A) or in formula (M), respectively, are/is reacted with a compound of formula (K)

E—H                       (K), in which E has the same definition as in formula (A), in the presence of a hydroperoxide and of a catalytic amount of a metal compound; E, G1, G2, T1 and T2 also encompass all of the above-described and preferred embodiments and definitions.

The nitroxyl compounds with the formula (C) are predominantly known in the prior art; they can be prepared, for example, by reacting the corresponding sterically hindered amine of the formula (B) with hydrogen peroxide and sodium tungstate, as described by E. G. Rozantsev et al., in Synthesis, 1971, 192; or with tert-butyl hydroperoxide and molybdenum (VI) compounds as is published in U.S. Pat. No. 4,691,015, or in an analogous way.

The amines of the formula (B) are known from the literature. Preference is given to using sterically hindered amines (also called hindered amine light stabilizers (HALS) or hindered amine stabilizers (HAS)), particularly derivatives of tetramethylpiperidine (2,2,6,6-tetramethylpiperidine).

It is preferred to use a sterically hindered amine in the form of a compound of the formula (B) and/or in the form of the nitroxyl compound of the formula (C); where two or more chemically different sterically hindered amines are reacted, it is preferred to use 2 chemically different sterically hindered amines in the form of a compound of the formula (B) and/or in the form of the nitroxyl compound of the formula (C).

The hydroperoxide is preferably $H_2O_2$ or an organic hydroperoxide, preferably $H_2O_2$, alkyl hydroperoxides or aralkyl hydroperoxides.

Preferred alkyl hydroperoxides are tertiary alkyl hydroperoxides, an example being an alkane containing a hydroperoxy group on a tertiary carbon atom, and preferred aralkyl hydroperoxides are those which contain a hydroperoxy group on an alpha-carbon atom of an aralkyl compound.

Particularly suitable organic hydroperoxides are tert-butyl hydroperoxide, tert-amyl hydroperoxide, tert-hexyl hydroperoxide, tert-octyl hydroperoxide, ethylbenzene hydroperoxide, tetralin hydroperoxide or cumene (isopropylbenzene) hydroperoxide.

Preferred organic hydroperoxides are tert-butyl hydroperoxide, tert-amyl hydroperoxide, ethylbenzene hydroperoxide, and cumene hydroperoxide. Particularly preferred are tert-butyl hydroperoxide and cumene hydroperoxide.

The amount of organic hydroperoxide is between 1 to 20 mol, preferably between 1 and 10 mol, in particular between 1 to 5 mol of hydroperoxide per mole of total amount of amine of the formula (B) and/or nitroxyl compound of the formula (C).

The preferred amount of compound of the formula (K) for the process described also depends on the relative number of the reactive hydrogen atoms in the compound of the formula (K) and on the sterically hindered amine of the formula (B) and/or the nitroxyl compound of the formula (C). The reaction is typically carried out with a ratio of 0.01 to 1 mol of the compound of the formula (K) per mole of amine of the formula (B) or nitroxyl compound of the formula (C); preferably with the ratio of 0.1 to 1 mol of the compound of the formula (K) per mole of amine of the formula (B) or nitroxyl compound of the formula (C); and in particular with the ratio of 0.5 to 1 mol of the compound of the formula (K) per mole of amine of the formula (B) or nitroxyl compound of the formula (C).

The metals of the metal compound are preferably metals from groups IVb, Vb, VIIb, VIIb and VIII of the Periodic Table.

The metal compound is preferably vanadyl acetylacetonate, vanadium(III) acetylacetonate, cobalt carbonyl, chromium(VI) oxide, titanium tetrabutoxide, titanium(IV) isopropoxide, molybdenum hexacarbonyl and/or molybdenum trioxide.

With particular preference the metal compound is molybdenum trioxide.

Preferably the amount of metal compound used is 0.0001 to 0.6 mol, preferably 0.001 to 0.3 mol, in particular 0.01 to 0.15 mol, of metal compound per mole of total amount of amine of the formula (B) and/or nitroxyl compound of the formula (C).

More specifically the process described constitutes the reaction of a mixture of 0.5 to 1 mol of the compound of the formula (K), 1 to 10 mol of an organic hydroperoxide, and 0.01 mol to 0.15 mol of metal catalyst (e.g. molybdenum trioxide) per mole of the amine of the formula (B) or of the nitroxyl compound of the formula (C). Preferably the molar ratio of the metal catalyst (e.g. molybdenum trioxide) per mole of the amine of the formula (B) or of the nitroxyl compound of the formula (C) is in the range from 1:3 to 1:1000, in particular from 1:7 to 1:100.

The reaction is preferably performed at a temperature of 80 to 200° C.; preferably of 100 to 140° C. and in particular of 110 to 130° C.

The compound of the formula (K) can serve in two functions both as a reactant and, in melted form, as a solvent for the reaction. With preference the aforementioned process is performed in such a way that a further, organic or inorganic solvent is used. The reaction is preferably carried out in an inert organic solvent.

Commonly the compound of the formula (K) reacts with its aliphatic carbon-hydrogen bond, which is mostly activated. The inert solvents ought therefore to possess lower reactivities than the compounds of the formula (K); preferred solvents are acetonitrile, aromatic hydrocarbons, preferably benzene, chlorobenzene or toluene, $CCl_4$, alcohols, preferably methanol, ethanol, ethylene glycol or ethylene glycol monomethyl ether, and especially chlorobenzene. Inorganic solvents, such as water, are also possible. The reaction can be performed in a liquid phase or in separate phases.

The reaction atmosphere may be composed of air, of oxygen-enriched air and/or of inert gases (nitrogen, argon and helium).

The reaction mixture is heated until the red colour associated with the presence of the nitroxyl compound has disappeared or become very weak.

At the end of the reaction, before the isolation of the product, the remaining hydroperoxide must be carefully destroyed and reduced.

The invention also provides for the use of the compounds of the formula (A) for stabilizing organic material, preferably for stabilizing organic material against damage or degradation, in particular against the damaging effect caused by light, heat, other kinds of radiation, such as electron beams, for example, or oxidation. With particular preference the invention concerns the use of the compounds of the formula (A) for stabilizing organic material against the damaging effect caused by light, in other words their use as light stabilizers.

With another particular preference, the invention relates to the use the compounds of the formula (A) as flame-retardants for organic material, preferably for polymers more preferably polyolefins.

The organic material that is stabilized with the compounds of the formula (A) may be a low or high molecular mass organic compound, preferably a high molecular mass compound, more preferably an organic polymer, also called "polymer" below.

The compounds of the formula (A) are used preferably in a total amount of 0.01% to 90% by weight, more preferably of 0.01% to 10% by weight, in particular of 0.05% to 5% by weight, and especially of 0.1% to 3% by weight, based in each case on the total weight of organic material and compound of the formula (A).

Preferably the invention also concerns the use of the compounds of the formula (A) for stabilizing high molecular mass organic polymers, preferably of plastics, resins, varnishes, coloured compositions such as paints, for example, electrophotographic toners and developers, electret materials, colour filters, and also inks, including printing inks, more preferably plastics and varnishes, preferably for the purpose of stabilizing these high molecular organic polymers against damage or degradation, in particular by oxidation, heat, light or other kinds of radiation, such as electron beams, for example, and in particular by light; and the invention further provides for the use of the compounds of the formula (A) as a) release agent
b) flame retardant
c) light stabilizer
d) antioxidant
e) lubricant
f) additives
g) toner additive
i) adhesive, preferably hot-melt adhesive
k) casting compound
l) laminate sheet and/or
m) coating and also for their use in the aforementioned products or applications a) to m) and their use in plastics, resins, varnishes, coloured compositions such as paints, for example, electrophotographic toners and developers, electret materials, colour filters, and also inks, including printing inks, more preferably in plastics, varnishes, paints, candles, and polymers; and also their use for preparing the aforementioned products a) to m) and also plastics, resins, varnishes, coloured compositions such as paints, for example, electrophotographic toners and developers, electret materials, colour filters, and also inks, including printing inks, more preferably of plastics, paints, inks and candles, of models, preferably positive moulds for precision casting; their use in the preparation or for the modification of bitumen and in the preparation of polymers, particularly of PE homopolymers and PP homopolymers and of PE-PP copolymers, particularly for stabilizing bitumen, PE homopolymers, PP homopolymers and PE-PP copolymers against damage or degradation, in particular by oxidation, heat, light or other kinds of radiation, such as electron beams, for example, particularly by light.

Preferably the polymers stabilized with the compounds of the formula (A) are polymeric mouldings, films, filaments, tapes, sheets and/or fibres.

It is known that when pesticides are used, and owing to environmental effects such as sulphur-containing acid rain, agricultural films are observed to undergo damage. The compounds of the formula (A) are superior to known HALS compounds in their stabilizing action. A further preferred use of the compound of the formula (A), accordingly, is their use for stabilizing polymers which are exposed to chemicals, such as pesticides in particular, especially when they are used in greenhouses, or to environmental influences, such as, in particular, sulphur-containing acid rain. Preferred polymers for stabilization in this respect are polymers in the form of films, particularly agricultural films, and polymers in paints, especially in automotive paints.

The polymers preferably comprise further substances from the group of fillers and reinforcing substances such as glass fibres or natural fibres, glass beads or minerals such as chalk, pigments, antioxidants, light stabilizers, lubricants, colorants, nucleating agents, antistats, PVC stabilizers, acid scavengers, polymer processing assistants or aids, antiblock additives, slip additives, antifogging additives, antimicrobial additives, chemical foaming agents, crosslinking agents, degradants or degradation catalysts, optical brighteners, nucleating agents, chain regulators and chain extenders, additives for modifying the scratch resistance, processing stabilizers, processing assistants or aids and/or further flame retardants.

The invention also relates, finally, to compositions comprising at least one or two or more compounds of the formula (A) and at least one wax, preferably a fully synthetic, partially synthetic and/or natural wax, which may be polar or nonpolar.

The invention further provides a mixture M comprising the components K1) and K2) and optionally a component K3)
K1) being an organic material,
K2) being at least one, preferably one, compound of the formula (A), and
K3) being at least one, preferably one, substance (S);
the substance (S) being selected from one or more of the groups of
 UV absorbers,
 quenchers,
 phenolic antioxidants,
 thiocostabilizers,
 processing stabilizers,
 peroxide scavengers,
 hydroxylamines,
 nitrones,
 amine oxides,
 polyamide stabilizers, preferably copper salts in combination with iodides, and/or phosphorus compounds and salts of divalent manganese,
 basic costabilizers,
 nucleating agents,
 fillers and reinforcing substances, which may also be composed of wood, and which may also be so small that they appear transparent,
 further additives, preferably lubricants, plasticizers, pigments, it being possible for the pigments also to be so small that they appear transparent, rheology additives, catalysts, catalyst deactivators, optical brighteners, clarifiers, such as, for example, substituted and unsubstituted benzylidene- or dibenzylidene-sorbitols, flame retardants, antistats or blowing agents, benzofuranones and benzoindolinones, metal deactivators, HAS with N—H, N—R, N—O*, N—OH or N—OR substituents on the piperidine nitrogen,
 waxes.

The mixtures M preferably comprise
K1) 1% to 99.99% by weight, preferably 10% to 99.99% by weight, of at least one organic material,
K2) 0.01% to 99% by weight, preferably 0.01% to 90% by weight of at least one compound of the formula (A),
the weight percentages of components K1) and K2) based on the sum of components K1) and K2), and therefore the sum of components K1) and K2) always being 100% by weight;
and
K3) 0% to 90% by weight, preferably 0.01% to 90% by weight, of at least one substance (S);
the weight percentages of component K3) being based on the weight of the component K1);
and the sum of the amounts of components K1), K2) and K3) being 10% to 100% by weight, preferably 25% to 100% by weight, more preferably 50% to 100% by weight, in particular 75% to 100% by weight, of the mixture M.

With particular preference, the mixtures M comprise
K1) 1% to 99.99% by weight, preferably 10% to 99.99% by weight of at least one, preferably one, organic material, the organic material preferably being a polymer,
K2) 0.01% to 99% by weight, preferably 0.01% to 90% by weight of at least one, preferably one, compound of the formula (A),
and
K3) 0% to 90% by weight, preferably 0.01% to 90% by weight, of at least one,
preferably one, substance (S), preferably one or more additives and/or fillers; the weight percentages being based in each case on the total weight of the mixture M, and the sum of the components K1), K2) and K3) always being 100% by weight.

With more particular preference, the mixtures M consist of
K1) 1% to 99.99% by weight, preferably 10% to 99.99% by weight of at least one, preferably one, organic material, the organic material preferably being a polymer,
K2) 0.01% to 99% by weight, preferably 0.01% to 90% by weight of at least one, preferably one, compound of the formula (A),
and
K3) 0% to 90% by weight, preferably 0.01% to 90% by weight, of at least one substance (S), the substance (S) being preferably one or more additives and/or fillers;
the weight percentages being based in each case on the total weight of the mixture M, and the sum of the components K1), K2) and K3) always being 100% by weight.

The mixture M is prepared by physically uniting the components K1), K2) and optionally K3). The physical uniting can take place by any known method used to produce mixtures and blends, preferably by mixing, dispersing, dissolving, homogenizing or extruding. It may take place both in solid form and/or in liquid form, such as in melted form, for example. The mixture M preferably takes the form of a powder, granules, tablet, pellet, prill or liquid.

A UV absorber may be organic or inorganic in nature, it being possible for the particles to be so small that they appear transparent.

The organic material K1) to be stabilized is preferably an organic polymer, more preferably a natural, semi-synthetic or synthetic polymer, or a mixture of the stated components, in particular a thermoplastic polymer.

Thermoplastic polymers are, as described by Hans Domininghaus in "Die Kunststoffe and ihre Eigenschaften" [Plastics and their properties] 5$^{th}$ edition (1998), pp. 14-25, polymers whose molecular chains have no side branches or else have side branches whose number and length varies, these being polymers which on heating soften and have almost unlimited mouldability.

The compounds of the formula (A) exhibit virtually no intrinsic colour, exhibit good thermal stability and exhibit low odour.

Preferred fillers are
- glass (preferably in bead or in fibre form) in amounts of 0.1 to 10% by weight;
- oxides and/or hydroxides of the elements of the second and third main groups of the Periodic Table of the Elements (preferably aluminium and magnesium) in amounts of 1% to 50% by weight;
- phyllosilicates and clay minerals, preferably bentonites, montmorillonites, hectorites, saponites, precipitated/fumed/crystalline/amorphous silicas and chalk in amounts from 1% to 50% by weight;
- antioxidants in amounts from 0.01% to 1% by weight, preferably 0.01% to 0.5% by weight;
- light stabilizers in amounts from 0.1% to 3% by weight;
- lubricants in amounts from 0.01% to 5% by weight, preferably 0.01% to 2% by weight;
- colorants in amounts from 0.01% to 5% by weight;
- nucleating agents in amounts from 0.01% to 3% by weight, preferably 0.01% to 2% by weight;
- antistats in amounts from 0.01% to 5% by weight;
- PVC stabilizers in amounts from 0.1% to 50% by weight;
- acid scavengers in amounts from 0.01% to 5% by weight;
- polymer processing assistants in amounts from 0.01% to 1% by weight;
- antiblock additives in amounts from 0.01% to 1% by weight;
- slip additives in amounts from 0.01% to 1% by weight;
- antifogging additives in amounts from 0.1% to 5% by weight;
- antimicrobial additives in amounts from 0.01% to 5% by weight;
- chemical foaming agents in amounts from 0.1% to 5% by weight;
- crosslinking agents in amounts from 0.01% to 5% by weight;
- degradants in amounts from 0.1% to 5% by weight;
- optical brighteners in amounts from 0.01% to 1% by weight;
- chain regulators and chain extenders in amounts from 0.1% to 5% by weight;
- additives for modifying the scratch resistance in amounts from 0.1% to 5% by weight;
- processing stabilizers in amounts from 0.01% to 1% by weight;
- processing assistants (such as fluoropolymers, for example) in amounts from 0.01% to 5% by weight; and/or
- flame retardants in amounts from 1% to 40% by weight;

the stated percentages by weight being based in each case on the weight of the organic material K1).

Preferred additives are synergists, antioxidants, light stabilizers, lubricants, colorants, nucleating agents or antistats. Preferred examples of the adjuvants which can be used are specified in EP 0 584 567 A.

If the mixture M represents a stabilized polymer, the mixture M comprises preferably from 0.01% to 5% by weight, more preferably from 0.01% to 4% by weight, in particular from 0.05% to 2.5% by weight, based in each case on the total weight of the mixture M, of at least one compound of the formula (A).

When the compounds of formula (A) are used as flame retardants, it is preferable to use a total amount of from 0.01 to 50% by weight, more preferably of from 1 to 35% by weight, even more preferable of from 5 to 25% by weight, based in each case on the weight of the component K1), of the compounds of formula (A), with the component K1) being preferably a polymer.

When the compounds of formula (A) are used as flame retardants, the mixture M preferably comprises
of from 1 to 99% by weight, based on the total weight of the mixture M, of the component K1), with the component K1) being preferably a thermoplastic polymer or a mixture of thermoplastic polymers,
of from 0.1 to 30% by weight, based on the weight of the component K1), of the compounds of formula (A),
of from 0 to 60% by weight, based on the total weight of the mixture M, of additives,
of from 0 to 60% by weight, based on the total weight of the mixture M, of fillers, and
of from 0 to 60% by weight, based on the total weight of the mixture M, of further ingredients;
with the sum of the amounts of the components K1) and of the compounds of formula (A) being 10% to 100% by weight, preferably 25% to 100% by weight, more preferably 50% to 100% by weight, in particular 75% to 100% by weight, of the total weight of the mixture M.

The compounds of the formula (A) may, however, differ greatly in the amount of L1 groups. In addition it is possible for the groups L1 in the formula (A) to vary greatly if, for example, the compound of the formula (A) contains different groups L1. Consequently a further preferred statement of amount for the compounds of the formula (A) in the mixture M, in other words in the stabilized organic material, preferably in the stabilized polymer, is the unit "mole" which is customary in chemistry. In mole units, the stated amounts relate not to the compounds of the formula (A) themselves, but rather to the amount of active groups L1 in the formula (A) that are introduced by means of the compound of the formula (A) into the organic material K1), preferably into the polymer to be stabilized; preferably they relate to the amount of piperidine groups of the formula (A) introduced, in mole units, with the stated amount in moles of the groups L1 relating to the total amount of the organic material K1), in gram units, that is to be stabilized.

The number of groups L1 in the formula (A) which are introduced through the compound of the formula (A) into the organic material K1) is in the range 0.1 to 1000 µmol, preferably 0.5 to 100 µmol, more preferably 1 to 50 µmol, based in each case on 100 g of the organic material K1), preferably of the polymer.

The compounds of the formula (A) and, optionally, further substances (S) can be added to the organic material K1), preferably a polyolefin, either separately in 100% form or as a mixture, in which case the mixtures in question may be powder mixtures or low-dust or dust-free commercial forms. Their preparation can take place by the action of heat and/or mechanical forces and/or by the addition of further auxiliaries, such as by processing of melts, by extrusion or by purely mechanical compression, or by mixing, homogenizing, dispersing or dissolving. In this context it is possible for the fractions of the liquid and solid substances (S) to vary, through the choice of the parameters, within any desired limits between 100% by weight liquid and 100% by weight solid.

If the organic material K1) is a polymer, the compound of the formula (A) is introduced into the polymer preferably by extrusion; if the organic material is a low molecular mass organic material, then it is introduced preferably by mixing, homogenizing, dispersing or dissolving.

The compounds of the formula (A) and, optionally, the further substances (S) are incorporated into the organic material K1) to be stabilized, preferably into the polymer, by commonplace methods. Incorporation may take place, for example, by mixing or applying the claimed compounds and any further substances (S) into or onto the polymer immediately before, during or after the polymerization or into the polymer melt before or during shaping. Incorporation may also take place by applying the dissolved or dispersed compounds to the polymer directly or mixing them into a solution, suspension or emulsion of the polymer, where appropriate with subsequent evaporation of the solvent. The compounds are also effective if introduced into an already granulated polymer subsequently, in a separate processing step.

The compounds of the formula (A) can also be added as a mixture M in the form of a masterbatch to the organic material K1) to be stabilized, this form of addition being appropriate preferably if the organic material K1) to be stabilized is a polymer. If the mixture M constitutes a masterbatch, the mixture M contains the compounds of the formula (A) preferably in an amount of 1% to 80% by weight, more preferably of 2.5% to 50% by weight, in particular of 5% to 30% by weight, based in each case on the total weight of the masterbatch. The mixture M as a masterbatch is prepared preferably by mixing the components, including the masterbatch vehicle, and, where appropriate, by extruding.

The polymers are preferably polyolefins, more preferably polymers of mono- and diolefins, and especially polypropylene, polyisobutylene, polybut-1-ene, poly-4-methylpent-1-ene, polyisoprene or polybutadiene; polymers of cycloolefins, especially of cyclopentene or norbornene; polyethylene which may where appropriate have been crosslinked, especially high-density polyethylene (HDPE), polyethylene of high density and high molar mass (HDPE-HMW), polyethylene of high density and ultra-high molar mass (HDPE-UHMW), polyethylene of medium density (MDPE), polyethylene of low density (LDPE), linear polyethylene of low density (LLDPE), branched polyethylene of low density (VLDPE); or mixtures of these polymers.

The polymers are preferably copolymers of monoolefins and diolefins with one another or with other vinyl monomers, such as ethylene-propylene copolymers, LLDPE and mixtures of LLDPE with LDPE, propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene, such as hexadiene, dicyclopentadiene or ethylidenenorbornene; furthermore, mixtures of such polymers and copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers, polyalkylene/carbon monoxide copolymers of alternating or random construction, and their mixtures with other polymers such as polyamides, for example.

With preference the polymers are hydrocarbon resins (e.g. C5-C9) including hydrogenated modifications thereof (e.g. tackifier resins) and mixtures of polyalkylenes and starch.

With preference the polymers are polystyrene, poly(p-methylstyrene), poly(alpha-methylstyrene).

With preference the polymers are copolymers of styrene or alpha-methylstyrene with dienes or acrylic derivatives, such as styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; high-impact mixtures of styrene copolymers and another polymer, such as a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylene-styrene.

With preference the polymers are graft copolymers of styrene or alpha-methylstyrene, such as styrene on polybutadiene, styrene on polybutadiene-styrene copolymers or on polybutadiene-acrylonitrile copolymers, styrene and acrylonitrile (and/or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates and/or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and also mixtures thereof, of the kind known for example as ABS, MBS, ASA or AES polymers.

With preference the polymers are halogen-containing polymers, such as polychloroprene, chlorinated rubber, chlorinated and brominated copolymer of isobutylene-isoprene (halobutyl rubber), chlorinated or chlorosulphonated polyethylene, copolymers of ethylene and chlorinated ethylene, epichlorohydrin homopolymers and copolymers, particularly polymers of halogen-containing vinyl compounds, such as polyvinyl chloride, polyvinylidene chloride, polyvinyl fluoride, polyvinylidene fluoride; and also their copolymers, such as vinyl chloride-vinylidene chloride, vinyl chloride-vinyl acetate or vinylidene chloride-vinyl acetate.

With preference the polymers are polymers deriving from alpha,beta-unsaturated acids and their derivatives, such as polyacrylates and polymethacrylates, polymethyl-methacrylates, polyacrylamides and polyacrylonitriles impact-modified with butyl acrylate and copolymers of the stated monomers with one another or with other saturated monomers, such as acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

With preference the polymers are polymers deriving from unsaturated alcohols and amines and/or their acyl derivatives or acetals, such as polyvinyl alcohol, polyvinyl acetate, polyvinyl stearate, polyvinyl benzoate, polyvinyl maleate, polyvinylbutyral, polyallyl phthalate, polyallylmelamine; and also their copolymers with olefins.

With preference the polymers are homopolymers and copolymers of cyclic ethers, such as polyalkylene glycol, polyethylene oxide, polypropylene oxide or copolymers thereof with bisglycidyl ethers.

With preference the polymers are polyacetals, such as polyoxymethylene, and also those polyoxymethylenes which contain comonomers, such as ethylene oxide, for example;

polyacetals which have been modified with thermoplastic polyurethanes, acrylates or MBS.

With preference the polymers are polyphenylene oxides and polyphenylene sulphides and mixtures thereof with styrene polymers or polyamides.

With preference the polymers are polyurethanes which derive from polyethers, polyesters and polybutadienes having terminal hydroxyl groups, on the one hand, and from aliphatic or aromatic polyisocyanates, on the other, and also precursors thereof.

With preference the polymers are polyamides and copolyamides which derive from diamines and dicarboxylic acids and/or from aminocarboxylic acids or the corresponding lactams, such as Polyamide 4, Polyamide 6 (Akulon® K122, DSM; Zytel® 7301, DuPont; Durethan® B 29, Bayer), Polyamide 6/6 (Zytel® 101, DuPont; Durethan® A30, Durethan® AKV, Durethan® AM, Bayer; Ultramid® A3, BASF) 6/10, 6/9, 6/12, 4/6, 12/12, Polyamide 11, Polyamide 12 (Grillamid® L20, Ems Chemie), aromatic polyamides starting from m-xylene, diamine and adipic acid; polyamides prepared from hexamethylenediamine and isophthalic and/or terephthalic acid and, if desired, an elastomer modifier, e.g. poly-2,4,4-trimethylhexamethylene-terephthalamide or poly-m-phenyleneisophthalamide. Block copolymers of the aforementioned polyamides with polyolefins, olefin copolymers, ionomers or chemically bonded or grafted elastomers; or with polyethers, such as with polyethylene glycol, polypropylene glycol or polytetramethylene glycol, for example. Additionally, EPDM- or ABS-modified polyamides or copolyamides; and also polyamides condensed during processing ("RIM polyamide systems").

With preference the polymers are polyureas, polyimides, polyamidimides, polyetherimides, polyesterimides, polyhydantoins and polybenzimidazoles.

With preference the polymers are polyesters deriving from dicarboxylic acids and dialcohols and/or from hydroxycarboxylic acids or the corresponding lactones, such as polyethylene terephthalate, polybutylene terephthalate (Celanex® 2500, Celanex® 2002, Celanese; Ultradur®, BASF), poly-1, 4-dimethylolcyclohexane terephthalate, polyhydroxybenzoates, and also block polyether-esters deriving from polyethers having hydroxyl end groups; additionally, polyesters modified with polycarbonates or with MBS.

With preference the polymers are polycarbonates and polyestercarbonates and also polysulphones, polyethersulphones and polyetherketones.

With preference the polymers are crosslinked polymers deriving from aldehydes on the one hand and phenols, urea or melamine on the other, such as phenol-formaldehyde, urea-formaldehyde and melamine-formaldehyde resins; also suitable are drying and non-drying alkyd resins.

With preference the polymers are unsaturated polyester resins which derive from copolyesters of saturated or unsaturated dicarboxylic acids with polyhydric alcohols, and also vinyl compounds as crosslinking agents, and also their halogen-containing, modifications of low flammability.

With preference the polymers are crosslinkable acrylic resins which derive from substituted acrylic esters, such as from epoxy acrylates, urethane acrylates or polyester acrylates, for example.

With preference the polymers are alkyd resins, polyester resins and acrylate resins which have been crosslinked with melamine resins, urea resins, isocyanates, isocyanurates, polyisocyanates or epoxy resins.

With preference the polymers are crosslinked epoxide resins which derive from aliphatic, cycloaliphatic, heterocyclic or aromatic glycidyl compounds, examples being products of bisphenol A diglycidyl ethers, bisphenol F diglycidyl ethers, which are crosslinked by means of typical hardeners such as anhydrides or amines, for example, with or without accelerators.

Preferably the polymers are mixtures (polyblends) of the aforementioned polymers, such as PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PU, PC/thermoplastic PU, POM/acrylate, POM/MBS, PPO/HIPS, PPO/PA 6.6 and copolymers, PA/HDPE, PA/PP, PA/PPO, PBT/PC/ABS or PBT/PET/PC.

Preferably the polymers are polymers as specified in EP 1 038 912 A.

With particular preference the polymers are polystyrene, especially polystyrene-HI (High Impact), polyphenylene ethers, polyamides, polyesters, polycarbonates, polyolefins and blends of these polymers, or are polymer blends of the type ABS (acrylonitrile-butadiene-styrene) or PC/ABS (polycarbonate/acrylonitrile-butadiene-styrene).

In particular the polymers are a polyolefin, especially polypropylene or polyethylene.

In case of the use of the compounds of formula (A) as flame retardants, polymers are further preferably thermoset polymers, more preferably formaldehyde resin polymers, epoxy resin polymers, melamine resin polymers, phenolic resin polymers, and/or polyurethanes.

In case of the use of the compounds of formula (A) as flame retardants, polymers are further preferably polyolefins, such as polyethylene, polypropylene, ethylene-vinyl acetate.

Materials, particularly polymers, which comprise the compounds of the formula (A) employed in accordance with the invention can be used for producing any kind of end articles, such as extruded articles, moulded articles, preferably injection-moulded articles or blow-moulded articles, films, tapes, fibres, monofilaments, surface coatings, and also paints, etc.

In case of the use of the compounds of formula (A) as flame retardants, the polymer mouldings, polymer films, polymer filaments, and polymer fibres are characterized in that the material are preferably polyolefins, such as polyethylene, polypropylene, ethylene-vinyl acetate.

The flame-retardant components can be incorporated into thermoplastic polymers by, for example, premixing all of the constituents in the form of powders and/or pellets in a mixer and then homogenizing them in the polymer melt in a compounding assembly (e.g. a twin-screw extruder). The melt is usually drawn off in the form of an extrudate, and cooled and pelletized. The components can also be separately introduced directly into the compounding assembly by way of a feed system.

It is also possible to admix the flame-retardant additives with finished polymer pellets or with finished polymer powder and to process the mixture directly, for example, in a blown-film plant.

In case of the use of the compounds of formula (A) as flame retardants, the moulding compositions can also comprise fillers and reinforcing materials, such as glass fibres, glass beads, or minerals, such as chalk, alongside the inventive reaction products derived from wax and from sterically hindered amine. The moulding compositions can also comprise other additions, such as pigments, antioxidants, light stabilizers, lubricants, colorants, nucleating agents, antistatic agents, or further flame-retardants.

The flame-retardant plastics moulding compositions are suitable for production of mouldings and of films, filaments and fibres, e.g. via injection moulding, extrusion, blow moulding or press moulding.

Among the preferred further flame-retardants are (di)phosphinic salts of the formula (100-I) or (100-II), and/or polymers thereof,

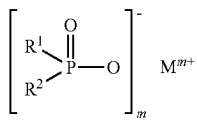 (100-I)

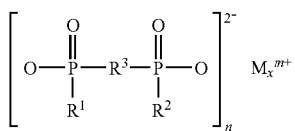 (100-II)

where
$R^1$ and $R^2$ are identical or different and are $C_1$-$C_6$-alkyl, linear or branched, and/or aryl;
$R^3$ is $C_1$-$C_{10}$-alkylene, linear or branched, $C_6$-$C_{10}$-arylene, or -alkylarylene, or arylalkylene;
M is Mg, Ca, Al, Sb, Sn, Ge, Ti, Zn, Fe, Zr, Ce, Bi, Sr, Mn, Li, Na, K, and/or a protonated nitrogen base;
m is from 1 to 4;
x is from 1 to 4;
n is (x*m)/2, preferably n is from 1 to 4.

Preferably, M is calcium, aluminium or zinc, and
$R^1$ and $R^2$, identical or different, are methyl, ethyl, n-propyl, isopropyl, n-butyl, tert-butyl, n-pentyl and/or phenyl.

Among protonated nitrogen bases, protonated bases of ammonia, melamine and triethanolamine, in particular $NH_4^+$, are preferred.

$R^3$ is preferably methylene, ethylene, n-propylene, isopropylene.

Other suitable further flame-retardants are melamine phosphate, dimelamine phosphate, melamine pyrophosphate, melamine polyphosphates, melam polyphosphates, melem polyphosphates, and/or melon polyphosphates; melamine condensates, such as melam, melem, and/or melon, or compounds of this type with higher degree of condensation, and also mixtures of the same, an example of a preparation method for these being that described in WO-A-96/16948; condensates of melamine; reaction products of melamine with phosphoric acid; reaction products of condensates of melamine with phosphoric acid; mixtures of the products mentioned.

Compounds of this type are described by way of example in WO 98/39306, WO 98/45364 and WO 98/08898.

Other suitable compounds are oligomeric esters of tris (hydroxyethyl)isocyanurate with aromatic polycarboxylic acids, benzoguanamine, tris(hydroxyethyl)isocyanurate, allantoin, glycoluril, melamine, melamine cyanurate, dicyandiamide and/or guanidine, and also nitrogen-containing phosphates of the formulae $(NH_4)_y H_{3-y} PO_4$ or $(NH_4 PO_3)_z$ where y is from 1 to 3 and z is from 1 to 10 000.

It is also possible to use a synthetic inorganic compound and/or a mineral product, in order to increase flame-retardant action. Examples among these are oxygen compounds of silicon, magnesium compounds, metal carbonates of metals of the second main group of the periodic table of the elements, red phosphorus, and also zinc compounds or aluminium compounds.

The oxygen compounds of silicon are preferably salts and esters of orthosilicic acid and condensates thereof, silicates, zeolites and silicas, glass powder, glass-ceramic powder or ceramic powder; the magnesium compounds are preferably magnesium hydroxide, hydrotalcites, magnesium carbonates or magnesium calcium carbonates; zinc compounds are preferably zinc oxide, zinc stannate, zinc hydroxystannate, zinc phosphate, zinc borate or zinc sulphides; the aluminium compounds are preferably aluminium hydroxide or aluminium phosphate.

Nitrogen compounds of the formulae (100-III) to (100-VIII) or a mixture of these can be used as further flame-retardant component

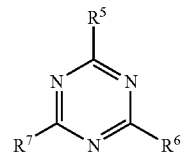 (100-III)

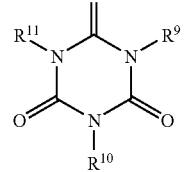 (100-IV)

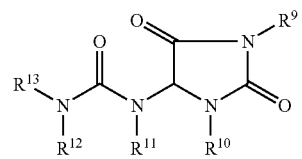 (100-V)

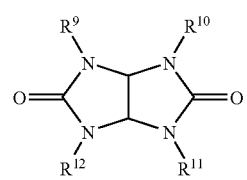 (100-VI)

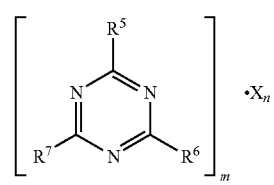 (100-VII)

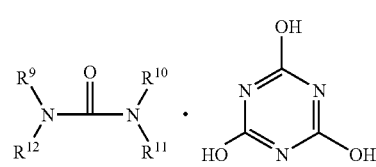 (100-VIII)

where
$R^5$ to $R^7$ are hydrogen, $C_1$-$C_8$-alkyl, $C_5$-$C_{16}$-cycloalkyl or -alkylcycloalkyl, optionally substituted with a hydroxy function or with a $C_1$-$C_4$-hydroxyalkyl function, $C_2$-$C_8$-alkenyl, $C_1$-$C_8$-alkoxy, -acyl -acyloxy, $C_6$-$C_{12}$-aryl or -arylalkyl, —$OR^8$ or —$N(R^8)R^9$, including systems of alicyclic-N or aromatic-N type,
$R^8$ is hydrogen, $C_1$-$C_8$-alkyl, $C_5$-$C_{16}$-cycloalkyl or -alkylcycloalkyl, optionally substituted with a hydroxy function or with a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl,
$R^9$ to $R^{13}$ have the same definition as $R^8$, or else are —O—$R^8$ m and n, independently of one another, are 1, 2, 3 or 4,
X are acids which can form adducts with triazine compounds (100-III).

It is also possible to use synergistic combinations of the phosphinates mentioned with certain nitrogen-containing compounds which are more effective flame-retardants than the phosphinates themselves in very many polymers (DE 196 14 424 A1, and also DE 197 34 437 A1 and DE 197 37 727 A1).

Surprisingly the stabilization accorded to the organic materials by means of compounds of the formula (A) inhibits the damage and/or the degradation of the organic material; one measure of the damage and/or degradation is the carbonyl index, particularly when the organic material is a polymer. Further criteria for assessing the damage or change to the organic material, such as the polymer degradation, for example, are preferably as follows:

- the discoloration, reported as the Yellowness Index in the CIE-Lab System or another recognized colorimetric system,
- the increase or decrease in the absorption at a specific wavelength or wavelength range in the CIE-Lab System or another recognized colorimetric system,
- the surface gloss,
- the transparency,
- the mechanical properties, for whose determination there are a very wide variety of variants, such as, for example, the tensile strength, the breaking elongation, the impact strength, the Izod or Charpy notched impact strengths, for example,
- the surface embrittlement,
- the melt flow index (MFI)
- the melt flow ratio (MFR).

These and other methods are known to the skilled person and are described for example in Grellmann Wolfgang, Seidler Sabine, Kunststoffprüfung, Hanser Verlag, 2005, ISBN 3-446-22086-0.

Reference is hereby made expressly to the measurement methods described therein.

The compounds of formula (A) are thermally stable and do not decompose the polymers during processing and do not affect the process of preparation of the plastics moulding compositions. The reaction products derived from wax and from sterically hindered amine are not volatile under the conventional conditions under which polymers, preferably thermoplastic polymers, are prepared and processed.

The invention is illustrated non-restrictingly by the examples below.

EXAMPLES

Substances Employed

| | |
|---|---|
| Hostavin ® N20: | 2,2,4,4-tetramethyl-7-oxa-3,20-diazadispiro[5.1.11.2]heneicosan-21-one, manufacturer: Clariant GmbH |
| Hostavin ® 845: | ester of 2,2,6,6-tetramethyl-4-piperidinol with higher fatty acids, especially stearic or palmitic acid and mixtures thereof, manufacturer: Clariant GmbH |
| Sanduvor ® 3055: | 3-dodecyl-1-(2,2,6,6-tetramethyl-4-piperidyl)pyrrolidine-2,5-dione, manufacturer: Clariant GmbH |
| Tinuvin ® 770: | bis(2,2,6,6-tetramethyl-4-piperidinyl) sebacate, manufacturer: Ciba SC |
| PE wax: | Licowax ® PE 520 |
| High-pressure PE wax: | Leunawachs ® 810 |
| PE wax: | TP Licocene ® PE 4201 |
| PE wax: | TP Licocene ® PE 3401 |
| PP wax: | Licowax ® PP 220 |
| PP wax: | Licowax ® PP 230 |
| PP wax: | TP ® Licocene PP 1302 |
| PP wax: | TP Licocene ® PP 1502 |
| PP wax: | TP Licocene ® PP 1602 |
| PP wax: | TP Licocene ® PP 2602 |
| PP wax: | TP Licocene ® PP 4202 |
| PP wax: | TP Licocene ® PP 6102 |
| PP wax: | TP Licocene ® PP 7502 |

The manufacturer of the waxes is Clariant GmbH.

| | |
|---|---|
| Processing stabilizer: | Hostanox ® PAR 24 from Clariant |
| Phenolic antioxidants: | Hostanox ® O 10 and Hostanox ® O 16 from Clariant |

Polymer:

Used as polyethylene was the LDPE Stamylan® 2102 TX 00 with an MFI of 1.07 g/10 min (190° C./2.16 kg) and an ISO 1183 density of 920-923 kg/m$^3$, from DSM.

Examples of Substances and Preparation

Examples of the compounds which can be prepared advantageously by the process of the invention presented here are the following:

Example 1

36.4 g of Hostavin® N 20, 200 g of Licowax® PE 520 and 2 g of molybdenum trioxide are introduced in 400 ml of chlorobenzene and the suspension is heated to 120° C. Under reflux, about 74 g of tert-butyl hydroperoxide (70% in water) are added dropwise until the solution remains colourless. Excess peroxide is destroyed by addition of sodium sulphite. Then the catalyst and the added salt are filtered off hot on a pressure filter and the solvent is removed by distillation.

This gives 218 g of pale greenish, brittle reaction product, which consists of the reaction product of Hostavin® N 20 with the Licowax® PE 520 wax.
N content: 1.14% (corresponding to a 15% content of Hostavin® N 20)
Drop point: 109° C.
Dyn. viscosity at 170° C.: 753 mPas Example 2

36.4 g of Hostavin® N 20, 200 g of Licowax® PE 520 and 1 g of molybdenum trioxide are introduced in 400 ml of chlorobenzene and the suspension is heated to 120° C. Under reflux, about 32 g of tert-butyl hydroperoxide (80% in di-tert-butyl peroxide) are added dropwise over a period of 60 h. Excess peroxide is destroyed by addition of sodium sulphite. Then the catalyst and the added salt are filtered off hot on a pressure filter and the solvent is removed by distillation.

This gives 230 g of pale beige, brittle reaction product, which consists of the reaction product of Hostavin® N 20 with the Licowax® PE 520 wax.
Drop point: 106° C.
Dyn. viscosity at 140° C.: 144 mPas Example 3

18.2 g of Hostavin® N 20, 50 g of Licowax® PE 520 and 1 g of molybdenum trioxide are introduced in 100 ml of chlorobenzene and the suspension is heated to 120° C. Under reflux, about 16.5 g of tert-butyl hydroperoxide (80% in di-tert-butyl peroxide) are added dropwise and the mixture is heated under reflux for 60 h. Excess peroxide is destroyed by addition of sodium sulphite. Then the catalyst and the added salt are filtered off hot on a pressure filter and the solvent is removed by distillation.

This gives 67 g of red-beige, brittle reaction product, which consists of the reaction product of Hostavin® N 20 with the Licowax® PE 520 wax.
N content: 2.01% (corresponding to a 26.3% content of Hostavin® N 20)
Drop point: 107° C.
Dyn. viscosity at 140° C.: 351 mPas Example 4

36.4 g of Hostavin® N 20, 20 g of Licowax® PE 520 and 2 g of molybdenum trioxide are introduced in 100 ml of chlorobenzene and the suspension is heated to 120° C. Under reflux, about 28 g of tert-butyl hydroperoxide (80% in di-tert-butyl peroxide) are added dropwise and the mixture is heated under reflux for 26 hours. Excess peroxide is destroyed by addition of sodium sulphite. Then the catalyst and the added salt are filtered off hot on a pressure filter and the solvent is removed by distillation.

This gives 55 g brown-red, brittle reaction product, which consists of the reaction product of Hostavin® N 20 with the Licowax® PE 520 wax.
N content: 4.87% (corresponding to a 63% content of Hostavin® N 20)
Drop point: 117° C.
Dyn. viscosity at 140° C.: 1253 mPas Example 5

9.48 g of Hostavin® N 20-N oxide, 50 g of Licowax® PE 520 and 1 g of molybdenum trioxide are introduced in 100 ml of chlorobenzene and the suspension is heated to 120° C. Under reflux, 5.6 g of tert-butyl hydroperoxide (80% in di-tert-butyl peroxide) are added dropwise. Then the mixture is heated under reflux for 10 hours. In the course of this heating the orange-red solution slowly loses its colour. Excess peroxide is destroyed by addition of sodium sulphite. Then the catalyst and the added salt are filtered off hot on a pressure filter and the solvent is removed by distillation.

This gives 57 g of pale yellowish brittle reaction product, which consists of the reaction product of Hostavin® N 20 oxide with the Licowax® PE 520 wax.
N content: 1.67% (corresponding to a 21.8% content of Hostavin® N 20)
Drop point: 109° C.
Dyn. viscosity at 140° C.: 227 mPas Example 6

36.4 g of Hostavin® N 20, 150 g of Leunawachs® 810 and 2 g of molybdenum trioxide are introduced in 400 ml of chlorobenzene and the suspension is heated to 120° C. Under reflux, about 65 g of tert-butyl hydroperoxide (70% in water) are added dropwise and the mixture is heated under reflux for 10 hours. Excess peroxide is destroyed by addition of sodium sulphite. Then the catalyst and the added salt are filtered off hot on a pressure filter and the solvent is removed by distillation.

This gives 183 g of pale brownish, brittle reaction product, which consists of the reaction product of Hostavin® N 20 with the Leunawachs® 810 wax.
N content: 1.46% (corresponding to a 19% content of Hostavin® N 20)
Drop point: 107° C.
Dynam. viscosity at 170° C.: 174 mPas Example 7

10.9 g of Hostavin® N 20, 60 g of Licowax® PP 220 and 1.5 g of molybdenum trioxide are introduced in 100 ml of chlorobenzene and the suspension is heated to 100° C. Under reflux, 33.8 g of tert-butyl hydroperoxide (80% in di-tert-butyl peroxide) are added dropwise. Then the mixture is heated under reflux for 12 hours. Excess peroxide is destroyed by addition of sodium sulphite. Then the catalyst and the added salt are filtered off hot on a pressure filter and the solvent is removed by distillation.

This gives 33 g of pale red-brownish reaction product, which consists of the reaction product of Hostavin® N 20 with the Licowax® PP 220 wax.
N content: 1.77% (corresponding to a 23.0% content of Hostavin® N 20)
Drop point: 152° C.
Dyn. viscosity at 170° C.: 34 mPas Example 8

7.3 g of Hostavin® N 20, 60 g of Licowax® PP 230 and 1 g of molybdenum trioxide are introduced in 100 ml of chlorobenzene and the suspension is heated to 120° C. Under reflux, 11.3 g of tert-butyl hydroperoxide (80% in di-tert-butyl peroxide) are added dropwise. Then the mixture is heated under reflux for 11 hours. Excess peroxide is destroyed by addition of sodium sulphite. Then the catalyst and the added salt are filtered off hot on a pressure filter and the solvent is removed by distillation.

This gives 64 g of pale brownish reaction product, which consists of the reaction product of Hostavin® N 20 with the Licowax® PP 230 wax.
N content: 0.81% (corresponding to a 10.5% content of Hostavin® N 20)
Drop point: 147° C.
Dyn. viscosity at 170° C.: 106 mPas Example 9

18.2 g of Hostavin® N 20, 42.4 g of TP-Licocene PE 4201 and 2.5 g of molybdenum trioxide are introduced in 100 ml chlorobenzene and the suspension is heated to 140° C. Under reflux, 56.3 g of tert-butyl hydroperoxide (80% in di-tert-butyl peroxide) are added dropwise. Then the mixture is heated under reflux for 4 hours. Excess peroxide is destroyed by addition of sodium sulphite. Then the catalyst and the added salt are filtered off hot on a pressure filter and the solvent is removed by distillation.

This gives 56.3 g of pale beige reaction product, which consists of the reaction product of Hostavin® N 20 with the TP-Licocene PE 4201 wax.
N content: 2.25% (corresponding to a 29.3% content of Hostavin® N 20)
Drop point: 112° C.
Dyn. viscosity at 140° C.: 54 mPas Example 10

7.3 g of ®Hostavin® N 20, 56 g of TP®Licocene PP 1302 and 1 g of molybdenum trioxide are introduced in 100 ml of chlorobenzene and the suspension is heated to 120° C. Under reflux, about 22.6 g of tert-butyl hydroperoxide (70% in water) are added dropwise until the solution remains colourless. Excess peroxide is destroyed by addition of sodium sulphite. Then the catalyst and the added salt are filtered off hot on a pressure filter and the solvent is removed by distillation.

This gives 62 g of pale orange, brittle reaction product, which consists of the reaction product of Hostavin® N 20 with the Licocene PP 1302 wax.

Example 11

10.2 g of Sanduvor 3055, 50 g of Licowax® PE 520 and 1.0 g of molybdenum trioxide are introduced in 200 ml of chlorobenzene and the suspension is heated to 120° C. Under reflux, about 7.5 g of tert-butyl hydroperoxide (80% in di-tert-butyl peroxide) are added dropwise and the mixture is heated under reflux for 35 h. Excess peroxide is destroyed by addition of sodium sulphite. Then the catalyst and the added salt are filtered off hot on a pressure filter and the solvent is removed by distillation.

This gives 57 g of pale yellow reaction product, which consists of the reaction product of Sanduvor 3055 with the Licowax® PE 520 wax.
N content: 0.6% (corresponding to a 8.6% content of Sanduvor 3055)
Drop point: 107° C.
Dyn. viscosity at 140° C.: 74 mPas Example 12

10.5 g of Hostavin® 845, 50 g of Licowax® PE 520 and 1.0 g of molybdenum trioxide are introduced in 200 ml of chlorobenzene and the suspension is heated to 120° C. Under reflux, 8.5 g of tert-butyl hydroperoxide (80% in di-tert-butyl peroxide) are added dropwise. Then the mixture is heated under reflux for 12 h. Excess peroxide is destroyed by addition of sodium sulphite. Then the catalyst and the added salt are filtered off hot on a pressure filter and the solvent is removed by distillation.

This gives 58 g of yellowish reaction product, which consists of the reaction product of Hostavin® N 845 with the Licowax® PE 520 wax.
N content: 1.1% (corresponding to a 33% content of Hostavin® 845)
Drop point: 105° C.
Dyn. viscosity at 140° C.: 97 mPas Example 13

3.9 g of triacetoneamine, 50 g of Licowax® PE 520 and 1 g of molybdenum trioxide are introduced in 200 ml of chlorobenzene and the suspension is heated to 120° C. Under reflux, about 8.5 g of tert-butyl hydroperoxide (80% in di-tert-butyl peroxide) are added dropwise. Then the mixture is heated under reflux for 13 h. Excess peroxide is destroyed by addition of sodium sulphite. Then the catalyst and the added salt are filtered off hot on a pressure filter and the solvent is removed by distillation.

This gives 52 g of pale beige reaction product, which consists of the reaction product of triacetoneamine with the Licowax® PE 520 wax.
N content: 0.38% (corresponding to a 4.2% content of triacetoneamine)
Drop point: 113° C.
Dyn. viscosity at 140° C.: 61 mPas Example 14

3.9 g of tetramethylpiperidinol, 50 g of Licowax® PE 520 and 1 g of molybdenum trioxide are introduced in 200 ml of chlorobenzene and the suspension is heated to 110° C. Under reflux, about 8.5 g of tert-butyl hydroperoxide (80% in di-tert-butyl peroxide) are added dropwise and the mixture is heated under reflux for 22 h. Excess peroxide is destroyed by addition of sodium sulphite. Then the catalyst and the added salt are filtered off hot on a pressure filter and the solvent is removed by distillation.

This gives 52 g of yellowish reaction product, which consists of the reaction product of tetramethylpiperidinol with the Licowax® PE 520 wax.
N content: 0.53% (corresponding to a 5.9% content of piperidinol)
Drop point: 112° C.
Dyn. viscosity at 140° C.: 67 mPas Example 15

3.6 g of tetramethylpiperidine (TMPP), 50 g of Licowax® PE 520 and 1 g of molybdenum trioxide are introduced in 200 ml of chlorobenzene and the suspension is heated to 120° C. Under reflux, about 11 g of tert-butyl hydroperoxide (80% in di-tert-butyl peroxide) are added dropwise and the mixture is heated under reflux for 11 h. Excess peroxide is destroyed by addition of sodium sulphite. Then the catalyst and the added salt are filtered off hot on a pressure filter and the solvent is removed by distillation.

This gives 54 g of pale yellowish reaction product, which consists of the reaction product of tetramethylpiperidine with the Licowax® PE 520 wax.
N content: 0.45% (corresponding to a 5.2% content of tetramethylpiperidine)
Drop point: 110° C.
Dyn. viscosity at 140° C.: 71 mPas Example 16

2 g of di-tert-butylamine nitroxide, 25 g of Licowax® PE 520 and 0.5 g of molybdenum trioxide are introduced in 150 ml of chlorobenzene and the suspension is heated to 120° C. Under reflux, 2.8 g of tert-butyl hydroperoxide (80% in di-tert-butyl peroxide) are added dropwise. Then the mixture is heated under reflux for 3 h. Excess peroxide is destroyed by addition of sodium sulphite. Then the catalyst and the added salt are filtered off hot on a pressure filter and the solvent is removed by distillation.

This gives 22 g of pale yellowish reaction product, which consists of the reaction product of di-tert-butylamine nitroxide with the Licowax® PE 520 wax.
N content: 0.17% (corresponding to a 1.6% content of di-tert-butyl nitroxide)
Drop point: 115° C.
Dyn. viscosity at 140° C.: 63 mPas Example 17

2.6 g of diisopropylamine, 50 g of Licowax® PE 520 and 1.0 g of molybdenum trioxide are introduced in 200 ml of chlorobenzene and the suspension is heated to 110° C. Under reflux, about 8.5 g of tert-butyl hydroperoxide (80% in di-tert-butyl peroxide) are added dropwise and the mixture is heated under reflux for 18 h. Excess peroxide is destroyed by addition of sodium sulphite. Then the catalyst and the added salt are filtered off hot on a pressure filter and the solvent is removed by distillation.

This gives 50 g of pale beige reaction product, which consists of the reaction product of diisopropylamine with the Licowax® PE 520 wax.
N content: 0.13% (corresponding to a 0.9% content of diisopropylamine)
Drop point: 114° C.
Dyn. viscosity at 140° C.: 87 mPas Example 18

24.0 g of Tinuvin® 770, 200 g of Licowax® PE 520 and 2 g of molybdenum trioxide are introduced in 400 ml of chlorobenzene and the suspension is heated to 120° C. Under reflux, about 90 g of tert-butyl hydroperoxide (70% in water) are added dropwise, and the mixture is heated under reflux for 12 h. Excess peroxide is destroyed by addition of sodium sulphite. Then the catalyst and the added salt are filtered off hot on a pressure filter and the solvent is removed by distillation.

This gives 221 g of pale beige, brittle reaction product, which consists of the reaction product of Tinuvin® 770 with the Licowax® PE 520 wax.
N content: 0.6% (corresponding to a 10.9% content of Tinuvin® 770)
Drop point: 114° C.
Dyn. viscosity at 140° C.: 7990 mPas Example 19

21 g of Hostavin® 845, 20.3 g of ®Sanduvor 3055, 100 g of Licowax® PE 520 and 2 g of molybdenum trioxide are introduced in 400 ml of chlorobenzene and the suspension is heated to 120° C. Under reflux, about 90 g of tert-butyl hydroperoxide (70% in water) are added dropwise until the solution remains colourless. Excess peroxide is destroyed by addition of sodium sulphite. Then the catalyst and the added salt are filtered off hot on a pressure filter and the solvent is removed by distillation.

This gives 138 g of pale beige, brittle reaction product, which consists of the reaction products of Hostavin® 845 and Sanduvor 3055 with the Licowax® PE 520 wax.
N content: 1.2%
Drop point: 113° C.
Dyn. viscosity at 140° C.: 848 mPas
Examples of Substances, Preparation and Use Further examples of the compounds which can be prepared advantageously by the process of the invention presented here, and of their use, are as follows:

The percentages by weight specified in Examples 56 to 61 and 62 to 66 are based on the total weight of all substances employed and therefore add up to 100% by weight. In Comparative Examples 56 and 62, polypropylene or polyethylene, respectively, was used instead of the 1% by weight of the compound of the formula (A).

The sheets produced in accordance with Examples 56 to 61 and 62 to 66 are subjected to accelerated UV ageing in accordance with DIN EN ISO 4892-2, method A.

The degradation of the polymer is followed by means of what is called the carbonyl index. This method, which is known and accepted in technical circles, uses the infrared spectrum to keep track of the increase of carbonyl groups in the polymer, which is, directly, a measure of the damage to the polymer. The higher the carbonyl index, the poorer the condition of the sheet.

Example 51

36.4 g of Hostavin N 20, 200 g of Licowax PE 520 and 2 g of molybdenum trioxide are introduced in 400 ml of chlorobenzene and the suspension is heated to 120° C. Under reflux, about 74 g of tert-butyl hydroperoxide (70% in water) are added dropwise, until the solution remains colourless. Excess peroxide is destroyed by addition of sodium sulphite. Then the catalyst and the added salt are filtered off hot on a pressure filter and the solvent is removed by distillation.

This gives 218 g of pale greenish, brittle reaction product, which consists of the compound of the formula (A) of Hostavin N 20 with the Licowax PE 520 wax.
N content: 1.14% (corresponding to a 15% content of Hostavin N 20)
Drop point: 109° C.
Dyn. viscosity at 170° C.: 753 mPas Example 52

36.4 g of Hostavin N 20, 150 g of Leunawachs 810 and 2 g of molybdenum trioxide are introduced in 400 ml of chlorobenzene and the suspension is heated to 120° C. Under reflux, about 65 g of tert-butyl hydroperoxide (70% in water) are added dropwise and the mixture is heated under reflux for 10 hours. Excess peroxide is destroyed by addition of sodium sulphite. Then the catalyst and the added salt are filtered off hot on a pressure filter and the solvent is removed by distillation.

This gives 183 g of pale brownish, brittle reaction product, which consists of the compound of the formula (A) of Hostavin N 20 with the Leunawachs 810 wax.
N content: 1.46% (corresponding to a 19% content of Hostavin N 20)
Drop point: 107° C.
Dynam. viscosity at 170° C.: 174 mPas Example 53

18.2 g of Hostavin N 20, 50 g of Licowax PE 520 and 1 g of molybdenum trioxide are introduced in 100 ml of chlorobenzene and the suspension is heated to 120° C. Under reflux, about 16.5 g of tert-butyl hydroperoxide (80% in di-tert-butyl peroxide) are added dropwise and the mixture is heated under reflux for 16 hours. Excess peroxide is destroyed by addition of sodium sulphite. Then the catalyst and the added salt are filtered off hot on a pressure filter and the solvent is removed by distillation.

This gives 67 g of pale red-beige, brittle reaction product, which consists of the compound of the formula (A) of Hostavin N 20 with the Licowax PE 520 wax.
N content: 2.01% (corresponding to a 26.3% content of Hostavin N 20)
Drop point: 107° C.
Dyn. viscosity at 140° C.: 351 mPas Example 54

36.4 g of Hostavin N 20, 20 g of Licowax PE 520 and 2 g of molybdenum trioxide are introduced in 100 ml of chlorobenzene and the suspension is heated to 120° C. Under reflux, about 28 g of tert-butyl hydroperoxide (80% in di-tert-butyl peroxide) are added dropwise and the mixture is heated under reflux for 26 hours. Excess peroxide is destroyed by addition of sodium sulphite. Then the catalyst and the added salt are filtered off hot on a pressure filter and the solvent is removed by distillation.

This gives 55 g of brown-red, brittle reaction product, which consists of the compound of the formula (A) of Hostavin N 20 with the Licowax PE 520 wax.
N content: 4.87% (corresponding to a 63% content of Hostavin N 20)
Drop point: 117° C.
Dyn. viscosity at 140° C.: 1253 mPas Example 55

7.3 g of Hostavin N 20, 56 g of Licocene PP 1302 and 1 g of molybdenum trioxide are introduced in 100 ml of chlorobenzene and the suspension is heated to 120° C. Under reflux, about 22.6 g of tert-butyl hydroperoxide (70% in water) are added dropwise, until the solution remains colourless. Excess peroxide is destroyed by addition of sodium sulphite. Then the catalyst and the added salt are filtered off hot on a pressure filter and the solvent is removed by distillation.

This gives 62 g of pale orange, brittle reaction product, which consists of the compound of the formula (A) of Hostavin N 20 with the Licocene PP 1302 wax.

Examples 56 to 61

Stabilization of Polypropylene

Mixtures of 1% by weight of the respective compound of the formula (A) from Example 51 to 55, which is component K2) in the mixture M, with 98.7% by weight of polypropylene, 0.1% by weight of calcium stearate, 0.1% by weight of processing stabilizer Hostanox® PAR 24 and 0.1% by weight of a phenolic antioxidant (Hostanox® O 10) are processed at 190° C. on a laboratory kneader for 10 minutes to form a homogeneous mass. Compressed sheets 100 μm thick are produced from this mass on a laboratory press at 190° C. These sheets are then subjected to accelerated UV ageing in accordance with DIN EN ISO 4892-2, method A, and the degradation of the polymer is followed by means of the carbonyl index.

| Example | Component K2) Product from example | Increase in carbonyl index after 803 h |
|---|---|---|
| 56 (comparative) | No stabilizer | Sheet completely destroyed after 479 h |
| 57 | 51 | 0.25 |
| 58 | 52 | 0.24 |
| 59 | 53 | 0.13 |
| 60 | 54 | 0.00 |
| 61 | 55 | 2.13 |

Through the use of compounds of the formula (A) it is possible, in comparison with the comparative example in accordance with the prior art, to achieve a substantially greater stabilization of the polymer towards the damaging effect induced by light, heat, other kinds of radiation, such as electron beams, for example, or oxidation, particularly of light.

Examples 62 to 66

Stabilization of Polyethylene

Mixtures of 1% by weight of the respective compound of the formula (A) from Example 51 to 55, which is component K2) in the mixture M, with 98.85% by weight of polyethylene, 0.1% of processing stabilizer (Hostanox PAR 24) and 0.05% by weight of a phenolic antioxidant (Hostanox O 16) are processed at 180° C. on a laboratory kneader for 10 minutes to form a homogeneous mass. Compressed sheets 100 μm thick are produced from this mass on a laboratory press at 180° C. These sheets are then subjected to accelerated UV ageing in accordance with DIN EN ISO 4892-2, method A, and the degradation of the polymer is followed by means of the carbonyl index.

| Example | Component K2) Product from example | Carbonyl index after 637 h |
|---|---|---|
| 62 (comparative) | No stabilizer | 3.76 |
| 63 | 51 | 0.87 |
| 64 | 52 | 0.57 |
| 65 | 53 | 0.46 |
| 66 | 54 | 0.44 |

The substantially slower increase in the carbonyl index shows clearly the stabilizing action of the mixtures.

Further Examples of Substances, Preparation and Use

Further examples of the compounds which can be prepared advantageously by the process of the invention presented here, and of their use, are as follows:

Materials Used:

Stamylan® LD 2102 Z 500, low-density polyethylene (LDPE), MFR from 1.7 to 2.2 g/10 min, produced by: DSM, Geleen, Netherlands Hostavin® N20: 2,2,4,4-tetramethyl-7-oxa-3,20-diazadispiro[5.1.11.2]heneicosan-21-one, CAS No. 64338-16-5

Licowax® PE 520: non-polar polyethylene wax, prepared by the Ziegler process, molecular weight about 2000, drop point about 120° C.

Licowax® PP 220 and PP 230: non-polar polypropylene waxes, prepared by the Ziegler process, drop point about 163° C.

Licocen® TP PE 4201, non-polar polypropylene waxes, prepared by the metallocene process For Comparison:

Flamestab® NOR 116: 1,3-propanediamines, N,N"-1,2-ethanediylbis-, reaction product with cyclohexane and peroxidized N-butyl-2,2,6,6-tetramethyl-4-piperidineamine-2,4,6-trichloro-1,3,5-triazines reaction product, produced by Ciba Specialty Chemicals CAS No. 191680-81-6

Preparation of Inventive Amino Ethers Derived from Sterically Hindered Amine and Wax Example 70

36.4 g of Hostavin N 20, 200 g of Licowax PE 520 and 2 g of molybdenum trioxide are used as initial charge in 400 ml of chlorobenzene and the suspension is heated to 120° C. 64.3 g of tert-butyl hydroperoxide (70% in water) are added dropwise at reflux. The mixture is then heated at reflux for 5 hours with removal of water from the system. In this process, the solution becomes slightly reddish, but it subsequently assumes a less intense colour. If the solution does not become colourless, a further 10 g of tert-butyl hydroperoxide (70%) are added dropwise. Excess peroxide is decomposed by adding sodium sulphite. The catalyst and the added salt is then removed by hot filtration with the aid of a pressure filter and the solvent is removed by distillation.

This gives 152 g of slightly greenish, brittle reaction product.
N content: 1.14% (corresponding to 15% N20 content)
Drop point: 107.6° C.

The product is thermally stable up to 265° C. Yellowness Index is 29.2.

Example 71

18.2 g of Hostavin N 20, 50 g of Licowax PE 520 and 1 g of molybdenum trioxide are used as initial charge in 100 ml of chlorobenzene and the suspension is heated to 120° C. 11.5 g of tert-butyl hydroperoxide (80% in di-tert-butylperoxide) are added dropwise at reflux. The mixture is then heated at reflux for 16 hours. In this process, the solution becomes slightly reddish, but it subsequently assumes a less intense colour. If the solution does not become colourless, a further 5 g of tert-butyl hydroperoxide (80%) are added dropwise. Excess peroxide is decomposed by adding sodium sulphite. The catalyst and the added salt is then removed by hot filtration with the aid of a pressure filter and the solvent is removed by distillation.

This gives 67 g of slightly reddish-beige-coloured, brittle reaction product.
N content: 2.01% (corresponding to 26.3% N20 content)

Example 72

36.4 g of Hostavin N 20, 200 g of Leunawachs 810 and 2 g of molybdenum trioxide are used as initial charge in 400 ml of chlorobenzene and the suspension is heated to 120° C. 64.3 g of tert-butyl hydroperoxide (70% in water) are added dropwise at reflux. The mixture is then heated at reflux for 10 hours. In this process, the solution becomes slightly reddish, but it subsequently assumes a less intense colour. If the solution does not become colourless, a further 10 g of tert-butyl hydroperoxide (80%) are added dropwise. Excess peroxide is decomposed by adding sodium sulphite. The catalyst and the added salt is then removed by hot filtration with the aid of a pressure filter and the solvent is removed by distillation.

This gives 183 g of slightly brownish, brittle reaction product.
N content: 1.46% (corresponding to 19% N20 content)
Drop point: 101.3° C. (for comparison, Leunawachs 810: from 110 to 115° C.)

Example 73

10.9 g of Hostavin N 20, 60 g of Licowax PP 220 and 1.5 g of molybdenum trioxide are used as initial charge in 100 ml of chlorobenzene and the suspension is heated to 100° C. 33.8 g of tert-butyl hydroperoxide (80% in di-tert-butylperoxide) are added dropwise at reflux. The mixture is then heated at reflux for 12 hours. In this process, the solution becomes slightly reddish, but it subsequently assumes a less intense colour. Excess peroxide is decomposed by adding sodium sulphite. The catalyst and the added salt is then removed by hot filtration with the aid of a pressure filter and the solvent is removed by distillation.

This gives 33 g of slightly red-brownish, brittle reaction product.

Example 74

7.3 g of Hostavin N 20, 60 g of Licowax PP 230 and 1 g of molybdenum trioxide are used as initial charge in 100 ml of chlorobenzene and the suspension is heated to 120° C. 11.3 g of tert-butyl hydroperoxide (80% in di-tert-butylperoxide) are added dropwise at reflux. The mixture is then heated at reflux for 11 hours. In this process, the solution becomes slightly reddish, but it subsequently assumes a less intense colour. Excess peroxide is decomposed by adding sodium sulphite. The catalyst and the added salt is then removed by hot filtration with the aid of a pressure filter and the solvent is removed by distillation.

This gives 64 g of slightly brownish reaction product.

Example 75

18.2 g of Hostavin N 20, 42.4 g of N20-NO-Licocen TP PE 4201 and 2.5 g of molybdenum trioxide are used as initial charge in 100 ml of chlorobenzene and the suspension is heated to 140° C. 56.3 g of tert-butyl hydroperoxide (80% in di-tert-butylperoxide) are added dropwise at reflux. The mixture is then heated at reflux for 4 hours. In this process, the solution becomes slightly reddish, but it subsequently assumes a less intense colour. Excess peroxide is decomposed by adding sodium sulphite. The catalyst and the added salt is then removed by hot filtration with the aid of a pressure filter and the solvent is removed by distillation.

This gives 56.3 g of pale beige reaction product.

Polymer and additive were mixed in an Arenz KL 1 single-screw extruder at a temperature of from 180 to 210° C. and with a rotation rate of 100 rpm.

Blown foils of thickness 200 µm were produced on a Collin BL 180/400 blown-film plant at from 160 to 200° C.

The flame-retardancy of the foils was measured to DIN 4102 B2 using test specimens of dimensions 190*90 mm, which were clamped vertically while a flame was applied to the lower edge for 15 sec., using a gas burner whose flame height was 20 mm. The test is passed if, during a period of 20 seconds, the tip of the flames does not reach a reference mark on the test specimens at a distance of 150 mm from the lower edge to which the flame is applied.

The melt volume rate (MVR) was determined according to DIN EN ISO 1133.

The Ultimate tensile strength was determined according to ISO 527-1/-2/-3.

Table 1 shows the results of the foils of thickness 200 µm without (Example 80) and with in each case 1% of additive. Example 81 is a comparative example of an amino ether of a sterically hindered amine with cyclohexane. Examples 82 to 83 are inventive examples with amino ethers derived from sterically hindered amines and waxes.

TABLE 1

Incorporation and DIN 4102 B2 test on 200 µm LDPE foils

| Example | Additive (1%) | Discoloration | Odour | DIN 4102 | B2 |
|---|---|---|---|---|---|
| 80 (comparison) | without | without | none | no | no |
| 81 (comparison) | Flamestab NOR 116 | slightly yellow | unpleasant | yes | yes |
| 82 | from Example 70 | without | none | yes | yes |
| 83 | from Example 71 | without | none | yes | yes |
| 84 | from Example 72 | without | none | yes | yes |
| 85 | from Example 73 | without | none | yes | yes |
| 86 | from Example 74 | without | none | yes | yes |
| 87 | from Example 75 | without | none | yes | yes |

In the case of comparative Example 81, the discoloration of the foils and the unpleasant odour is noticeable during production of the blown foils. In contrast, no discoloration and no development of odour occurs in the inventive examples.

Table 2 shows the melt index (melt volume rate MVR) of the flame-retardant LDPE foils, and the ultimate tensile strength. In contrast with the comparative example, the inventive amino ethers permitted achievement of improved processability (=higher melt index) and improved mechanical properties.

TABLE 2

Melt index and ultimate tensile strength of LDPE foils

| Example | Additive (1%) | MVR 190° C., 2.16 kg | Ultimate tensile strength N/mm$^2$ |
|---|---|---|---|
| 88 (comparison) | Flamestab NOR 116 | 2.5 | 16.6 |
| 89 | from Example 72 | 2.8 | 18.9 |
| 90 | from Example 74 | 2.9 | 19.8 |

The invention claimed is:
1. A meltable compound of the formula (A),

  (A)

wherein
L1 is the same or different and is a group of the formula (M),

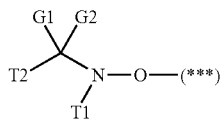  (M)

wherein
(***) marks the bond of the group of the formula (M) to the group E in the formula (A);
G1 and G2 are the same or different and are independently of one another
hydrogen, halogen, NO$_2$, cyano, CONR$_5$R$_6$, (R$_9$) COOR$_4$, C(O)—R$_7$, OR$_8$, SR$_8$, NHR$_8$, N(R$_{18}$)$_2$, carbamoyl, di(C$_1$-C$_{18}$-alkyl)carbamoyl, C(=NR$_5$)(NHR$_6$), C$_1$-C$_{18}$-alkyl; C$_3$-C$_{18}$-alkenyl; C$_3$-C$_{18}$-alkynyl, C$_7$-C$_9$-phenylalkyl, C$_3$-C$_{12}$-cycloalkyl, C$_2$-C$_{12}$-heterocycloalkyl;
C$_1$-C$_{18}$-alkyl, C$_3$-C$_{18}$-alkenyl, C$_3$-C$_{18}$-alkynyl, C$_7$-C$_9$-phenylalkyl, C$_3$-C$_{12}$-cycloalkyl, or C$_2$-C$_{12}$-heterocycloalkyl, wherein the C$_1$-C$_{18}$-alkyl, C$_3$-C$_{18}$-alkenyl, C$_3$-C$_{18}$-alkynyl, C$_7$-C$_9$-phenylalkyl, C$_3$-C$_{12}$-cycloalkyl, or C$_2$-C$_{12}$-heterocycloalkyl is substituted by OH, halogen, NO$_2$, amino, cyano, carboxyl, COOR$_{21}$, C(O)—R$_{22}$, C$_1$-C$_4$-alkoxy, C$_1$-C$_4$-alkylthio, C$_1$-C$_4$-alkylamino, di(C$_1$-C$_4$-alkyl)amino or O—C(O)—R$_7$;
C$_2$-C$_{18}$-alkyl interrupted by at least one O atom by —NR$_5$—, or a combination thereof;
C$_6$-C$_{10}$-aryl;
phenyl or naphthyl, wherein the phenyl or naphthyl is substituted by C$_1$-C$_4$-alkyl, C$_1$-C$_4$-alkoxy, C$_1$-C$_4$-alkythio, halogen, cyano, hydroxyl, carboxyl, COOR$_{21}$, C(O)—R$_{22}$, C$_1$-C$_4$-alkylamino or di(C$_1$-C$_4$-alkyl)amino;
or
G1 and G2, together with C atom to which they are attached, form a C$_3$-C$_{12}$ ring;
T1 is hydrogen, a primary C$_1$-C$_{18}$-alkyl, a secondary C$_3$-C$_{18}$-alkyl, a tertiary C$_4$-C$_{18}$-alkyl or a phenyl group, wherein T1 is unsubstituted or substituted by halogen, OH, COOR$_{21}$ or C(O)—R$_{22}$; or
T1 is C$_5$-C$_{12}$-cycloalkyl, the C$_5$-C$_{12}$-cycloalkyl interrupted by at least one O or —N(R$_{18}$)—; or
T1 is a polycyclic alkyl radical having 7 to 18 C atoms, or the same radical interrupted by at least one —O— or —N(R$_{18}$)—;
T2 is hydrogen, halogen, NO$_2$, cyano or a monovalent organic radical having 1 to 50 C atoms; or
T2 and T1 together form a group of the formula (F),

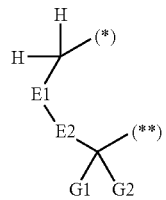  (F)

wherein
(*) marks the bond to the quaternary C atom, substituted by G1 and G2, in the formula (M), and
(**) marks the bond to the nitrogen N in the formula (M),
E2 is —CO— or —(CH$_2$)$_b$—, b being 0, 1 or 2;
E1 is —CO—, —(C=NR$_{23}$)—, —(NR$_{23}$)—, —(CR$_{24}$R$_{25}$)—, or —O—,
wherein
R$_{24}$ and R$_{25}$ are the same or different and independently of one another are H, OH, OR$_{26}$ or NR$_{27}$R$_{28}$;
or
R$_{24}$ and R$_{25}$ together form a group of the formula (H),

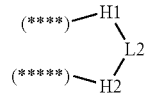  (H)

wherein
(**) and (***) represent the bond to the quaternary carbon atom of —(CR$_{24}$R$_{25}$)— in E1 from the formula (F),
H1 is —CH$_2$—, —CO— or —NR$_{29}$—;
H2 is —O—, —CH$_2$—, —CO— or —NR$_{29}$—;
R$_{23}$, R$_{26}$, R$_{27}$, R$_{28}$ and R$_{29}$ are the same or different and independently of one another are hydrogen or an organic radical having in total 1 to 500 carbon atoms and 0 to 200 heteroatoms, the heteroatoms being oxygen, nitrogen, sulphur, phosphorus, silicon or halogens,
L2 is a divalent organic radical having 1 to 500 C atoms and 0 to 200 heteroatoms, the heteroatoms being oxygen, nitrogen, sulphur, phosphorus, silicon or halogens, and wherein together with H1 and H2 from the formula (H) and with the quaternary carbon atom from —(CR$_{24}$R$_{25}$)— in E1 from the formula (F) forms an optionally substituted 4, 5, 6 or 7 membered ring;
and
R$_4$ is hydrogen, C$_1$-C$_{18}$-alkyl, phenyl, an alkali metal ion or a tetraalkylammonium cation;
R$_5$ and R$_6$ are independently of one another hydrogen, C$_1$-C$_{18}$-alkyl, C$_2$-C$_{18}$-alkyl substituted by hydroxyl or, taken together, form a C$_2$-C$_{12}$-alkylene bridge or a $C_2$-$C_{12}$-alkylene bridge interrupted by —O—, —N($R_{18}$)— or a combination thereof;

$R_7$ is hydrogen, $C_1$-$C_{18}$-alkyl or $C_6$-$C_{10}$-aryl;

$R_8$ is hydrogen, $C_1$-$C_{18}$-alkyl or $C_2$-$C_{18}$-hydroxyalkyl;

$R_9$ is $C_1$-$C_{12}$-alkylene or a bond;

$R_{18}$ is $C_1$-$C_{12}$-alkyl or phenyl, unsubstituted or substituted by halogen, OH, $COOR_{21}$ or C(O)—$R_{22}$;

$R_{21}$ is hydrogen, an alkali metal atom or $C_1$-$C_{18}$-alkyl;

$R_{22}$ is $C_1$-$C_{18}$-alkyl;

E is a wax with a $C_{80}$-$C_{800}$-alkyl group, optionally the alkyl chain of the alkyl group contains alkyl substituents, aromatic substituents and polar groups as substituents and is interrupted by alkene units and heteroatoms; and n is an integer from 1 to 20.

2. A compound of the formula (A) according to claim 1, wherein

G1 and G2, independently of one another, are hydrogen, $C_1$-$C_{18}$-alkyl, $C_3$-$C_{18}$-alkenyl, $C_3$-$C_{18}$-alkynyl, $C_7$-$C_9$-phenylalkyl, $C_3$-$C_{12}$-cycloalkyl; or G1 and G2, together with the C atom to which they are attached, form a $C_5$-$C_{12}$ ring.

3. A compound of the formula (A) according to claim 1, wherein

G1 and G2 independently of one another are hydrogen or $C_1$-$C_{18}$-alkyl;

T1 is a tertiary $C_4$-$C_{18}$-alkyl group or phenyl group;

T2 is hydrogen or a monovalent organic radical containing 1 to 50 carbon atoms;

or T2 and T1 together form a group of the formula (F), b being 0 or 1.

4. A compound of the formula (A) according to claim 1, wherein T1 and T2, together with the nitrogen atom N in the formula (M) and with the quaternary C atom, substituted by G1 and G2, in the formula (M) are a tetramethylpiperidyl group.

5. A compound of the formula (A) according to claim 4, wherein the tetramethylpiperidyl group is 2,2,6,6-tetramethylpiperidine, 2,2,6,6-tetramethylpiperidin-4-one, 2,2,6,6-tetramethylpiperidin-4-ol, 4-amino-2,2,6,6-tetramethylpiperidine, 2,2,4,4-tetramethyl-7-oxa-3,20-diazadispiro-[5.1.11.2]heneicosan-21-one, 2,2,4,4-tetramethyl-20-lauryloxycarbonylethyl-7-oxa-3,20-diazadispiro[5.1.11.2]heneicosan-21-one, 2,2,4,4-tetramethyl-20-myristyloxycarbonylethyl-7-oxa-3,20-diazadispiro[5.1.11.2]heneicosan-21-one, bis(2,2,6,6-tetramethyl-4-piperidinyl)sebacate, esters of 2,2,6,6-tetramethyl-4-piperidinol with higher fatty acids, N,N'-bis-2,2,6,6-tetramethyl-4-piperidinyl-1,3-benzenedicarboxamide, 2,2,4,4-tetramethyl-20-(β-myristyloxycarbonyl)ethyl-7-oxa-3,20-diazadispiro-[5.1.11.2]heneicosan-21-one, 2,2,4,4-tetramethyl-20-(β-lauryloxycarbonyl)ethyl-7-oxa-3,20-diazadispiro-[5.1.11.2]-heneicosan-21-one, 3-dodecyl-1-(2,2,6,6-tetramethyl-4-piperidyl)pyrrolidine-2,5-dione, 2,2,6,6-tetramethyl-4N-(β-lauryloxycarbonyl)ethylaminopiperidine, 2,2,6,6-tetramethyl-4N-(β-myristyloxycarbonyl)ethylaminopiperidine, N,N'-1,6-hexanediylbis(N-(2,2,6,6-tetramethylpiperidin-4-yl)formamide), 2,6-bis(2,2,6,6-tetramethylpiperidin-4-yl)-1H,4H,5H,8H-2,3a,4a,6,7a,8a-hexaazaperhydrocyclopentafluorene-4,8-dione or 3-dodecyl-7,7,9,9-tetramethyl-1,3,8-triazaspiro[4.5]decane-2,4-dione.

6. A compound of the formula (A) according to claim 1, wherein L2 is a divalent organic radical having 1 to 500 C atoms and 0 to 200 heteroatoms, the heteroatoms being oxygen, nitrogen, sulphur, phosphorus, silicon or halogens, and wherein together with H1 and H2 from the formula (H) and with the quaternary carbon atom from —($CR_{24}R_{25}$)— in E1 from the formula (F) forms an optionally substituted a 5 or 6 membered ring.

7. A stabilized organic material comprising a compound of the formula (A) according to claim 1.

8. A light stabilizer comprising a compound of the formula (A) according to claim 1.

9. A flame retardant for thermoplastic or thermoset polymers comprising a compound of the formula (A) according to claim 1.

10. A mixture comprising components K1) and K2) and optionally component K3),

K1) being an organic material,

K2) being at least one compound of the formula (A) according to claim 1, and

K3) being at least one substance (S);

selected from group consisting of

UV absorbers, quenchers, phenolic antioxidants, thiocostabilizers, processing stabilizers, peroxide scavengers, hydroxylamines, nitrones, amine oxides, polyamide stabilizers, basic costabilizers, nucleating agents, fillers and reinforcing substances, optionally composed of wood, and optionally transparent, lubricants, plasticizers, pigments, wherein the pigments are optionally transparent, rheology additives, catalysts, catalyst deactivators, optical brighteners, clarifiers, flame retardants, antistats, blowing agents, benzofuranones, benzoindolinones, metal deactivators, HAS with N—H, N—R, N—O*, N—OH or N—OR substituents on the piperidine nitrogen, waxes and combinations thereof.

11. The mixture according to claim 10, wherein the polyamide stabilizers are copper salts in combination with iodides, phosphorus compounds, salts of divalent manganese or a combination thereof.

12. The mixture according to claim 10, wherein the clarifiers are substituted and unsubstituted benzylidene- or dibenzylidene-sorbitols.

13. A process for preparing a meltable compound of the formula (A)

$$[L1\!-\!]_n\!-\!E \quad (A)$$

comprising the step of reacting at least one compound of the formula (B), at least one compound of the formula (C) or a combination thereof,

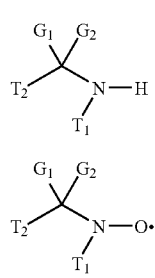
(B)

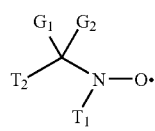
(C)

wherein G1, G2, T1, T2 and n have the same meaning as defined in formula (M) according to claim 1, with a compound of formula (K) in the presence of a hydroperoxide and of a catalytic amount of a metal compound,

E-H    (K), wherein E is a $C_{60}$-$C_{1000\,000}$-alkyl group, wherein the alkyl chain of the alkyl group optionally contains alkyl substituents, aromatic substituents and polar groups as substituents and to be interrupted by alkene units and heteroatoms.

* * * * *